US006609159B1

(12) United States Patent
Dukach et al.

(10) Patent No.: US 6,609,159 B1
(45) Date of Patent: Aug. 19, 2003

(54) METHODS, SYSTEMS, AND MACHINE READABLE PROGRAMMING FOR INTERPOSING FRONT END SERVERS BETWEEN SERVERS AND CLIENTS

(75) Inventors: Semyon Dukach, 82 Chestnut St. Apt. 51, Boston, MA (US) 02108; Uri Guttman, Arlington, MA (US); Christopher M. Montgomery, Somerville, MA (US)

(73) Assignee: Semyon Dukach, Brookline, MA (US)

( * ) Notice: Subject to any disclaimer, the term of this patent is extended or adjusted under 35 U.S.C. 154(b) by 0 days.

(21) Appl. No.: 09/201,303

(22) Filed: Nov. 30, 1998

(51) Int. Cl.[7] .................................................. G06F 9/54
(52) U.S. Cl. ........................ 709/331; 709/230; 709/227; 709/203
(58) Field of Search ................................. 709/310–320, 709/200–203, 328–332, 226–231, 100–106

(56) References Cited

U.S. PATENT DOCUMENTS

| 5,276,879 | A |   | 1/1994  | Barry et al. ................. 709/106 |
| 5,452,447 | A |   | 9/1995  | Nelson et al. ............... 707/205 |
| 5,572,709 | A |   | 11/1996 | Fowler et al. ............... 703/217 |
| 5,774,660 | A |   | 6/1998  | Brendel et al. .............. 709/201 |
| 5,926,636 | A | * | 7/1999  | Lam et al. ................... 709/328 |
| 5,987,517 | A | * | 11/1999 | Firth et al. .................. 709/230 |
| 6,195,682 | B1| * | 2/2001  | Ho et al. ..................... 709/203 |
| 6,366,947 | B1| * | 4/2002  | Kavner ........................ 709/203 |
| 6,477,559 | B1| * | 11/2002 | Veluvali et al. ............. 709/101 |

OTHER PUBLICATIONS

Schmidt, Douglas C., "IPC SAP—A Family of Object–Oriented Interfaces for Local and Remote Interprocess Communication", C++ Report, pp (18), Nov./Dec. 1992.*

* cited by examiner

Primary Examiner—St. John Courtenay, III
(74) Attorney, Agent, or Firm—Edward W. Porter

(57) ABSTRACT

A client-server system includes a new front end server which interposes itself between a prior (back end) server and its clients using an interposed dynamically-loaded library linked to the back end. The interposed library and front end can provide enhanced services without requiring reconfiguration of either the back end server or its clients. The front end can accept network connections on the same port as the back end server is programmed to. The interposed library intercepts standard network system calls by the back end and emulates their behavior by communicating with the front end. The front end can send file descriptors of either direct connections with clients, or of pipes for relaying requests and response from and to clients through the front end, to the interposed library for return to calls by the back end to accept connections. The capabilities which the front end can provide include caching, protocol conversion, session affinity, filtering, traffic conversion, and spreading load between multiple back end processes.

28 Claims, 15 Drawing Sheets

-BACK END SERVER~110
  -...
    -for each network service to be handled~149
        -call socket to get a file descriptor for a new service socket~150
        -call bind with service socket file descriptor to define local end of service socket~152
        -call listen with service socket file descriptor to enable service socket to accept messages~154
    -possibly call fork multiple times~156
    -loop~158
        -call accept with service socket file descriptor~160
        -read file descriptor of temporary socket created for connection with client~162
        -call read with file descriptor of client connection to read client request~164
        -process client request~166
        -call write with file descriptor of client connection to write response to client~168
        -call close with file descriptor of client connection~170
    -...
    -for each network service being handled~171
        -call close with file descriptor of service socket~172
  -...

PRIOR ART
FIG. 11

-DYNAMICALLY-LOADED LIBRARY FUNCTIONS~116

-...
-BIND()~144AA
    -if call specifies a monitored network service~174
        -open a control pipe to front end for the network service~176
        -call dup2 to give it same file descriptor number as that used in bind call~178
        -add bind()'s file descriptor to list of monitored file descriptors~180
        -write a bind msg with call's parameters to new control pipe~182
        -read from control pipe info returned by front end's bind call~184
        -return with info from front end in standard OS format~186
    -else pass call to OS~188

-LISTEN()~144AB
    -if call's file descriptor is on list of monitored file descriptors~210
        -write listen msg with call's parameters to file descriptor's control pipe~212
        -read from control pipe info returned by front end's listen call~214
        -return with info from front end in standard OS format~216
    -else pass call to OS~220

-ACCEPT()~144AC
    -if call's file descriptor is on list of monitored file descriptors~230
        -write accept msg with call's parameter to file descriptor's control pipe~232
        -read from control pipe info returned by front end accept call~234
        -return with info from front end in OS format for socket info~236
    -else pass call to OS~238

-CLOSE()~144AD
    -if call's file descriptor is on list of monitored file descriptors~286
        -if file descriptor is last on list associated with a given control pipe~287
            -write close msg to descriptor's control pipe~288
            -read from control pipe any info returned by front end close call~290
            -close control pipe~291
        -remove file descriptor from list of monitored file descriptors~292
        -return with info from close in standard OS format~294
    -else pass call to OS~296
    -...

FIG. 12A

-DYNAMICALLY-LOADED LIBRARY FUNCTIONS~116

-DUP()~144AE
- if call's file descriptor is on list of monitored file descriptors~310
  - call dup~312
  - record new file descriptor returned by dup in list of monitored file descriptors, as dup of call's file descriptor~314
  - return with info returned from dup call in standard OS format~316
- else pass call to OS~318

-FORK()~144AF
- call fork~320
- if child process of fork~322
  - for each monitored file descriptor~324
    - if it is the first descriptor for a given control pipe, create a new control pipe for the service~326
    - call close for file descriptor to close child connections to pipe used by parent for same service~328
    - call dup2 to get a file descriptor pointing to the child's new pipe for the service which is the same at the monitored file descriptor~330
- return with info returned from fork call in standard OS format~332

FIG. 12B

-FRONT END SERVER~1221
  -...
    -if receive bind msg from a control pipe~194
        -call socket to get a file descriptor to be associated with the requested service~198
        -associate the file descriptor with the newly created control pipe~200
        -call bind with the file descriptor and the port specified by bind msg~202
        -write, to the new control pipe, info returned from bind call~204
    -if receive listen msg from a control pipe~222
        -call listen using front-end file descriptor associated with msg's control pipe~224
        -write, to listen msg's control pipe, info returned from listen call~226
    -if receive accept msg from a control pipe~240
        -call accept using file descriptor front end associates with msg's control pipe~242
        -peek, to client connection returned by accept call, to read client request~244
            -if request indicates it can be handled directly by back end server~246
                -write, to accept msg's control pipe, file descriptor and adr struct of client connection~248
                -close front end's file descriptor for client connection~249
            -else~250
                -open a new back end relay pipe~252
                -associate relay pipe's file descriptor with file descriptor of client connection~254
                -write, to accept msg's control pipe, the file descriptor of relay pipe and faked adr struct info~256
    -if receive msg from client connection associated with a back end relay pipe~264
        -read client request from client connection~266
        -perform conversion on message if necessary~268
        -write client request to relay pipe associated with client connection~270
    -if receive msg from a back end relay pipe~274
        -read back-end response from the relay pipe~276
        -perform conversion on message if necessary~278
        -write back-end response to client connection associated with relay pipe~280
        -close relay pipe~282
    -if receive a close msg from a control pipe~300
        -if msg's control pipe is only one associated with its network service~301
            -close front end data structures, including listen socket, associated with msg's control pipe~302
            -write info returned by close call to msg's control pipe~304
            -close msg's control pipe and client connection~306
  -...

FIG. 13

-CACHING FRONT END SERVER~112AA
- -...
  - -if receive accept msg from a control pipe~240
    - -call accept using file descriptor front end associates with msg's control pipe~242
    - -peek, to client connection returned by accept call, to read client request~244
      - <u>-if client request is for a cachable data object</u>~340
        - <u>-if data object is in cache</u>~342
          - <u>-write data object to client connection</u>~344
          - <u>-close client connection</u>~346
        - <u>-if data object is not in cache</u>~348
          - <u>-open a new back end relay pipe</u>~350
          - <u>-associate relay pipe's file descriptor with file descriptor of client connection</u>~352
          - <u>-write, to accept msg's control pipe, file descriptor of relay pipe and faked adr struct info</u>~354
      - <u>-else if client request is for a non-cachable data object</u>~356
        - <u>-write to accept msg's control pipe the file descriptor and adr struct of client connection</u>~358
  - -...
  - -if receive msg from a back end relay pipe~274
    - -read back-end response from the relay pipe~276
    - -*perform protocol conversion on message if necessary*~278
    - <u>-store response's data object in cache</u>~360
    - -write back-end response to client connection associated with relay pipe~280
    - -close relay pipe and client connection~282
- -...

FIG. 20

-FRONT END SERVER WHICH FILTERS BASED ON CLIENT~112CA
  -...
    -if receive accept msg from a control pipe~240
        -call accept using file descriptor front end associates with msg's control pipe~242
        <u>-if adr struct of client connection returned by accept call is for a non-allowed client~370</u>
            <u>-write to client connection a message that client is not allowed access~372</u>
            <u>-close client connection~374</u>
        <u>-else~376</u>
            -peek, to client connection returned by accept call, to read client request~244
            -if request indicates it can be handled directly by back end server~246
                -write to accept msg's control pipe file descriptor and adr struct of client connection~248
            -else~250
                -open a new back end relay pipe~252
                -associate relay pipe's file descriptor with file descriptor of client connection~254
                -write, to accept msg's control pipe, the file descriptor of relay pipe and faked adr struct info~256
  -...

FIG. 21

-FONT END SERVER WHICH MONITORS TRAFFIC~112HA

-...
   -if receive accept msg from a control pipe~240
        -call accept using file descriptor front end associates with msg's control pipe~242
        -peek, to client connection returned by accept call, to read client request~244
        <u>-update client traffic records to reflect the IP address of the client connection, the type of service requested, and the path URL of the client request</u>~380
        -if request indicates it can be handled directly by back end server~246
            -write to accept msg's control pipe file descriptor and adr struct of client connection~248
        -else~250
            -open a new back end relay pipe~252
            -associate relay pipe's file descriptor with file descriptor of client connection~254
        -write, to accept msg's control pipe, the file descriptor of relay pipe~256
-...

FIG. 22

-FRONT END SERVER~112J
- ...
    -if receive accept msg for a given network service~390
        -if have a client request on converted request queue for the service~392
            -open a new back end relay pipe~394
            -associate relay pipe's file descriptor with file descriptor of client connection~396
            -write, to accept msg's control pipe, the file descriptor of back end relay pipe and faked adr struct info~398
            -write request to back end relay pipe~400
        -else~402
            -call accept for listen socket associated with msg's control pipe~404
            -call peek for client connection returned by accept call~406
            -if client is using HTTP/1.0~408
                -... //steps similar to other FIGS. response to 1.0 requests~410
            -else if client is using HTTP/1.1~412
                -mark accepted connection as a sustained client connection associated with accept msg's associated network service~414
    -if have a request on sustained client connection~420
        -read client request from sustained client connection~422
        -if it is a request for CGI service~424
            -if client request is for CGI service~426
                -if sustained connection does not have a CGI relay pipe~428
                    -open new CGI relay pipe~430
                    -instruct CGI server to create a new process for client session, and to connect it to new CGI relay pipe~432
                    -associate file descriptor of new CGI pipe with file descriptor of the sustained client connection~433
                -write client request to client's associated relay pipe using the associated CGI relay pipe~434
            -else if request is not for CGI service~436
                -translates 1.1 headers to 1.0 headers~438
                -place request in converted request queue for connections associated network service~440
    -if have a response on a relay pipe~450
        -read response from relay pipe~452
        -if relay pipe is to back end and for a sustained client connection~454
            -perform protocol conversion on response~456
        -write response to associated sustained client connection~458
        -if relay pipe is to back end server~460
            -close relay pipe~462
        -if response is for a temporary client connection, close connection~464
- ...

FIG. 24

METHODS, SYSTEMS, AND MACHINE READABLE PROGRAMMING FOR INTERPOSING FRONT END SERVERS BETWEEN SERVERS AND CLIENTS

FIELD OF THE INVENTION

The present invention relates to client-server network computing, and, in particular, to methods, systems, and machine readable programming for interposing front end servers between servers and clients in such network computing.

BACKGROUND OF THE INVENTION

As the use of computer networks expands, client-server computing has become increasingly important. In client-server computing client computers access, over a computer network, information and computational resources available on a server computer. In client-server computing, the server computer runs one or more server software programs which provide clients access to centralized resources. These server programs are typically pre-written object code programs which are purchased or acquired from a third party. Thus, they usually cannot be directly modified by their end users. Programs typically called front end servers or middle-ware exist for providing enhancements to these servers, but they require the administrator of a particular computer to reconfigure the server's parameters and to support the resulting increase in system complexity.

The World Wide Web (Web) on the Internet is an extremely popular large scale networked system consisting largely of Web client programs on client computers, and Web server programs on server computers. In addition to server programs, most Web server computers also contain application server programs, such as CGI programs, which are called by server programs to handle certain types of client requests; and stored data, including Web pages and graphic files. It is possible for one computer to function both as a client and a server computer.

In the Web, client programs are commonly called browsers and the two most popular are Netscape Navigator and Microsoft Internet Explorer. The server programs are called Web servers (as opposed to the many of other server program types on the Internet, such as FTP servers, mail servers, etc.) and they can host one or more Web sites on each computer. Some of the more popular Web servers are the free Apache server and commercial ones from Netscape and Microsoft.

Like any heavily used program, the efficiency of Web servers is a major concern of the managers and administrators of Web sites. The reasons for concern are several. Web users have come to expect a certain level of dynamic response from the Web. Such users who perceive a site to be slow often will not visit it again. Sometimes a very heavily loaded Web server system can almost stop responding as it thrashes about doing I/O and doing very little useful work. When a server is thrashing, requests are accepted and serviced at a lower rate further degrading performance in a vicious cycle. Extreme load on a server can result in stability problems, crashes, and increased cost of maintaining the server.

There are many causes for inefficiency of Web servers. The following are some of the major ones and some of the current solutions for them.

Each request to a Web server from a browser using the HTTP 1.0 protocol, currently in common use, requires a new TCP/IP connection. This slows down the Web server, because it requires the server to accept and manage more connections. It also slows down the Internet itself, because it requires more information to be transported to establish the new connections for each separate client request. This problem is made worse by the fact that each separate object displayed in a web page, such as each separate graphic image, is usually obtained by a separate client request, meaning that accessing one web page commonly requires many separate connections.

The new HTTP/1.1 protocol helps solve this problem by multiplexing requests and responses from a given client over a single client connection. Some Web servers now being sold support this new protocol, but not all do. Furthermore, a large number of servers currently in use do not support this new protocol, and will need to be upgraded to do so. These upgrades can be costly in terms of purchase cost, administration expense, and down time. Such costs could slow the usage of the HTTP/1.1 protocol, or of any new, improved protocol.

Another factor which slows server performance, is the lack of caching. Many servers in current use, and even some still being sold, read each Web file requested by a client into memory each separate time it is requested. A caching Web server would normally keep a copy of many requested web data objects in memory. If a client request is for one of the data objects stored in its memory, the server saves the time of having to read the requested data object from disk into memory, and it can send a copy of the page directly from the memory to the requesting client, saving considerable time.

There are a wide variety of caching Web servers on the market, some free and some commercial. A few are integrated with the Web servers itself. Most are separate servers which act as a caching front end, which is interposed between clients and the server they work with, which we will call a back end server. These front end servers have to transfer non-cached requests to, and do I/O between clients and, the back end server.

A difficulty with prior caching front ends is that they normally require the back end server to be reconfigured to communicate with them, instead of directly with clients. Such back end reconfiguration can also require modification of the Web pages and CGI programs used by the back end, because the caching front end has to use the TCP numbers previously used by the back end, requiring that the back end used new TCP number. Such reconfiguration of the back end may also require routing information and other network configurations to be changed.

CGI stands for Common Gate Way Interface. It enables a Web server to call programs, often referred to as CGI scripts, to handle requests by a client which involve more than the mere sending of previously recorded data objects. A Web server typically handles a CGI request by forking off a new process of the desired CGI program and piping data to and from that new process. It is often desirable to maintain "session affinity" with CGI scripts, that is, to cause each of a successions of requests from a given client to be handled by the same forked CGI process. This is important because CGI scripts often handle the processing of individual transactions over the Web which require related multiple client requests, such as the filling out of multi-page registration forms or the placing of multiple articles into an electronic shopping cart and then purchasing them with a credit card. Many prior art servers, particularly those using HTTP 1.0 protocol maintain session affinity by use of cookies, i.e., data recorded in a client which the client will place in the headers of subsequent requests to the server to uniquely identify the client as one to be associated with a given CGI process. Unfortunately, using cookies to maintain session affinity requires the extra overhead of writing cookie information to clients, keeping track of which client has been sent which cookie, the parsing the cookie information from a client request, and looking that information up in the cookie/CGI-session data base to determine to which CGI session a given request should be sent.

There are many other functional improvements which could be made to many servers, whether they be Web servers or other types of servers. But the ability of those who operate servers to make such improvements is often hindered by the fact, referred to above, that making changes to a server computer's configuration can be costly. New server programs costs money. Perhaps even more daunting is the fact that changing server programs can often require that many time consuming changes be made to web pages and CGI scripts. The prior art has used front end servers to increase the functionality of back end servers, but usually at a considerable cost in terms of the reconfiguration required to use the added functionality such front end servers provide.

SUMMARY OF THE INVENTION

This invention relates to methods, computer systems, and programming recorded on machine readable memory which cause a front end server providing additional capability to be interposed between a back end server and client computers. It enables the front end server to be interposed by using an interposed dynamically-loaded library linked to the back end server. The library responds to certain network operating system ("OS") calls from the back end. Its major function is to communicate the. information in the intercepted calls to the front end server through interprocess communication links, also known as pipes. The front end server is programmed to respond to such information sent to it by establishing connections with clients; reading requests from, and writing responses, to clients; and relaying information relating to such connections, requests, and response to and from the back end server through the pipes with the library or back end.

In many embodiments of the invention, the library is programmed to return from each back end server call it intercepts with information in the same format as if the intercepted back end call had been executed directly by the OS, without the intervention of the library or front end server. This enables back end server communications with clients to be filtered or modified by the front end without the back end knowing it. Thus, it enables functionality—such as caching, protocol conversion, provision of session affinity, allocation of communications load between multiple back end server processes, and filtering of client requests by type of service or client address—to be performed without requiring any change to the back end server other than linking it to the interposed library.

In some embodiments of the invention, one of the calls intercepted by the interposed library is an OS call by the back end to accept a connection from a remote client. The library communicates the call to a front end server. The front end accepts a connection from a client and communicates a file descriptor representing the client connection to the library, and the library returns the file descriptor to the back end in standard format as if the connection had been accepted directly by the OS. In some cases, the file descriptor returned connects to a relay pipe which can be used to communicate between the back and front end servers. In some cases, file descriptor returned will connected directly to the client. In some cases the front end selects which client requests are appropriate for handling by the back end server, and, in some such cases, the front end delays sending a file descriptor to the library for return to a back end accept call, thus delaying the library's return from that call, until the front end reads or peeks at the request from a client on the connection to determines whether it is appropriate for the back end server to handle the request.

In some embodiments of the invention, the front end caches data objects requested by clients; and if a request is for a data object in its cache, the front end sends the object directly from the cache to the client. If the request is for a cachable data object not in its cache, the front end sends the library a file descriptor connecting to a relay pipe connected to the front end, and writes the client request to that pipe. When the front end receives the requested data object from the back end over the relay pipe in response to the client request, it caches the object and sends it to the client. Preferably, if the requested object is in its cache, the front end neither sends a file descriptor to the library for return to a back end accept call, nor writes the client request to a relay pipe. In some embodiments, if the requested object is not of a type to be cached by the front end, the front end sends the library a socket connected directly to the client, so the back end's reading of the request and writing of its response does not go through the front end.

In some embodiments of the invention, the front end server communicates with the back end server using a first protocol, communicates with the client using a second protocol, and performs conversion between protocols when relaying communications between the back end and clients. In some embodiments of the invention, the protocol used between the front and back ends, and that used between the front end and clients are totally different. In other embodiments, the two protocols can be different versions of the same protocol, such as, for example, an older version of a protocol, and a new version of the same protocol. In some embodiments, the front end can communicate with client's using a protocol, such as HTTP/1.1, which responds to each of a plurality of client requests using a single sustained socket, and communicate with a back end server according to a protocol, such as HTTP/1.0, which requires that a separate connection be created, read from, written to, and closed for each separate client request, even if they come from the same client within seconds or minutes of each other. In some such embodiments, for each client request the front end receives over a single sustained client connection, it creates a new relay pipe, communicates the file descriptor of that relay pipe to the library for return to the back end, writes the client request to relay pipe, reads the back end's response to the request from the relay pipe, closes the relay pipe, and writes the response to the client over the sustained connection.

In some embodiments of the invention, the front end responds to successive requests from a given client for service from a given application server, such as a CGI server, by calling the same process of that application server directly, rather than sending the request to the back end.

In some cases, the front end filters communications between clients and the back end server. F or example, in some embodiments it filters communications from client based on information about the client. In some embodiments, it filters requests from clients based on the type of request.

In some embodiments of the invention, the front end updates recorded information about communications with clients, such as, the number of requests from various portions of the network or the number of different types of requests. In some embodiments, the front end allocates load between multiple back end server processes, either of the same or of a different program.

DESCRIPTION OF THE DRAWINGS

These and other aspects of the present invention will become more evident upon reading the following description of preferred embodiment in conjunction with the accompanying drawings in which:

FIG. 11 is a highly simplified pseudo-code description of steps formed by one type of prior art back end server which can be used as the back end server shown in FIG. 1;

FIG. 12 (12A and 12B) is a highly simplified pseudo-code description of some of the steps which one embodiment of the interposed library of FIG. 1 performs when it intercepts various calls by the back end server to the OS;

FIG. 13 is a highly simplified pseudo-code description of some of the steps which one embodiment of the front end server shown in FIG. 1 performs;

FIG. 20 is a highly simplified pseudo-code description of some of the changes which can be made to the pseudo-code of FIG. 13 to make the front end program of FIG. 13 operate as a caching front end;

FIG. 21 is a highly simplified pseudo-code description of some of the changes which can be made to the pseudo-code of FIG. 13 to make the front end program of FIG. 13 filter client communications based on the identity of clients;

FIG. 22 is a highly simplified pseudo-code description of some of the changes which can be made to the pseudo-code of FIG. 13 to make the front end program of FIG. 13 update data structures to record information about the communications with clients;

FIG. 24 is a highly simplified pseudo-code description of some of the changes which can be made to the pseudo-code of FIG. 13 to make the front end program of FIG. 13 operate as the front end server shown in FIG. 23.

DETAILED DESCRIPTION OF PREFERRED EMBODIMENTS

Figure 1:
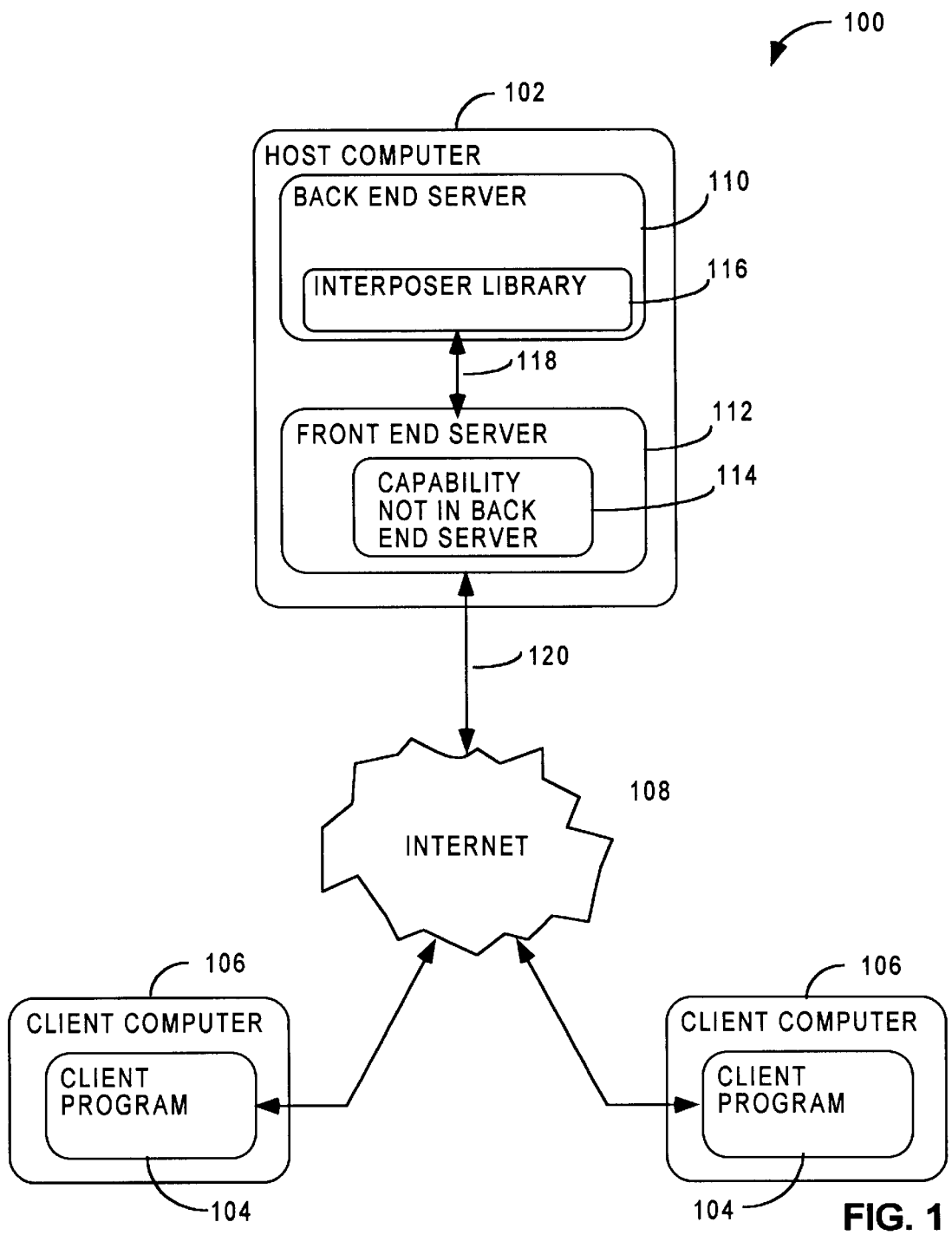
FIG. 1 is a schematic overview of a client-server system using an embodiment of the present invention, including a host computer containing a back end server, an interposed library linked to the back end server, and an interposed front end server.

FIG. 1 provides a simplified overview of one embodiment of the invention. It shows a client-server system 100 comprised of a host computer 102 which communicates with a plurality of client programs 104, each located on a client computer 106. The host computer 102 could be virtually any type of computer capable of operating as a network server. In FIG. 1, the computer network over which the server and clients communicate is the Internet. In other embodiments of the invention, a different type of network could be used, such as a local area network or a wide area network.

The server computer 102, includes a server program 110, which can be virtually any server program, including virtually any prior art server programs. We call this program a back end server to distinguish it from the front end server 112 which is loaded in the same operated system space on the same computer. The front end server is designed to be interposed between the back end server and client computers. It contains programming 114 which provides extra functionality in the communication with clients not provided by the back en d s erver.

The only change made to the back end server to make it work with the front end server is it s linking to the interposed library 116. Normally this can be done by simple, well known techniques, such as by listing the interposed library's in the path of libraries to be linked to the back end server in such a manner that any call by the back end server to a named function contained in the interposed library will be linked to that back end server call, rather than to any similarly named function in the OS. The enables the interposed library to intercept calls which the back end server makes to certain OS functions.

The interposed library 116 is programmed to respond to certain back end OS call which it intercepts by communicating the information in those calls to the front end server through interprocess channels, or pipes. These pipes are represented symbolically in FIG. 1 by the arrow 118. The front end server responds by establishing connections with clients, indicated symbolically by the arrow 120; reading requests from, and writing responses to, clients; and relaying information relating to such connections, requests, and response to and from the back end server, through the pipes 118 to the library and through pipes, described in more detail below, which connect directly to the back end 110.

The interposed library returns from each back end call it intercepts with information in the same format as if the back end call had been executed directly by the OS, without the intervention of the library or front end server. This enables the front end 112 to insert the functionality provided by the programming 114 between the back end 110 and its clients 106 without requiring any change to the back end server, other than its linking to the interposed library 116.

FIGS. 2–9 illustrate possible different versions of the front end server shown in FIG. 1. In each of these versions the front end server adds a different capability to the operation of the back end server. It should be understood that in other embodiments of the invention still other capabilities could be added by a front end server, and that a combination of multiple different capabilities could be included within a given front end server.

Figure 2:
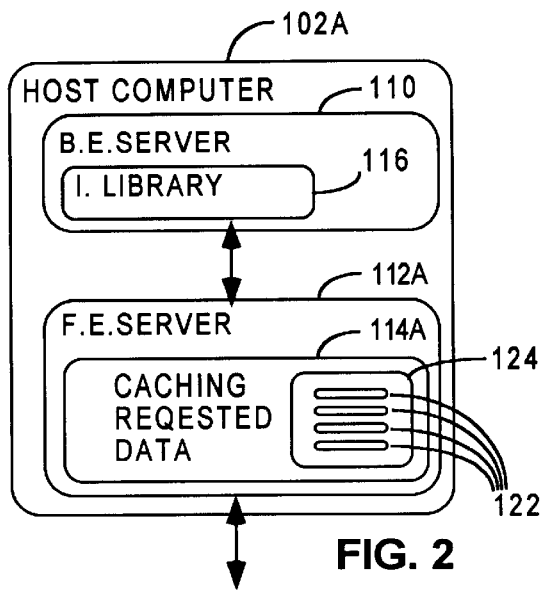
FIGS. 2–9 are schematic representations of possible variations to the front end server of FIG. 1 to add different functionality to its associated host computer.

FIG. 2 shows a server computer 102A in which the front end server 112A contains programming 114A which causes the front end to cache data objects 122 requested by clients in a cache 124. This enables the front end to provide the data objects asked for in many client requests without the need to even bother the back end server. A more detailed description of the operation of one embodiment of such a caching front end is provided below with regard to FIG. 20.

Figure 3:
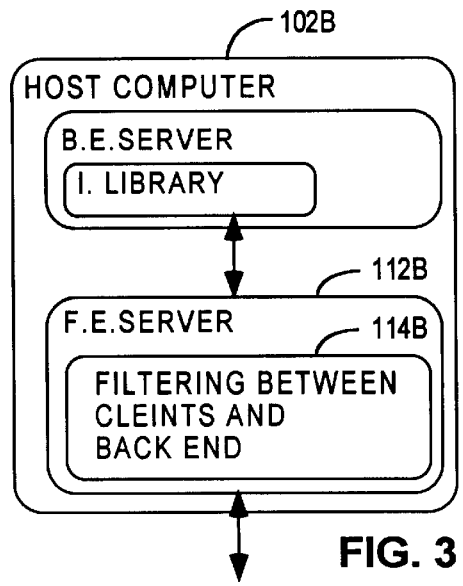

FIG. 3 shows a server computer 102B in which the front end server 112B contains programming 114B which causes the front end to filter communications between clients and its back end server. In different versions of this filtering front end, different types of filtering can be performed.

Figure 4:
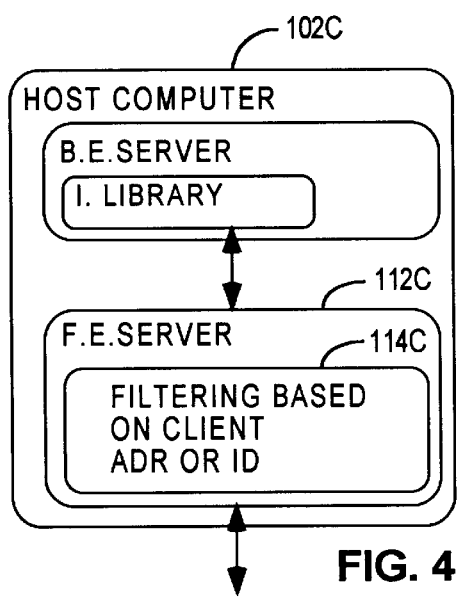

FIG. 4 shows a version 102C of the system shown in FIG. 3 in which the front end 112C includes programming 114C which performs filtering based on the address or ID of clients making requests to it. This could be used to prevent the back end from receiving requests from certain parts of the network or from certain machines. For example, this could be used to filter out requests which are not from a specified list of clients, which are not from clients on a particular set of one or more LANs or WANs, of which are from clients which the front end has determined, for one reason or another, should not be allowed to access the back end. One embodiment of such a front end is discussed below with regard to FIG. 21.

Figure 5:
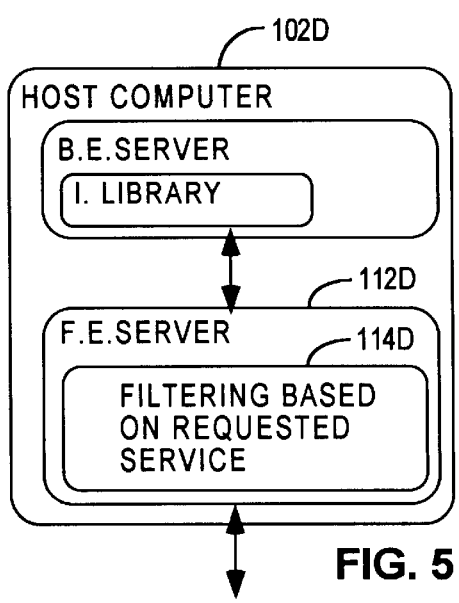

FIG. 5 shows another version 102D of the system shown in FIG. 3. In this version, the front end server 112D includes programming 114D which performs filtering based on the request received from a client. This could include filtering out client requests for certain types of service, requests which are of a certain protocol, or requests for certain types of data. For example, a caching front end of the type shown in FIG. 2 and FIG. 20 normally would filter from the back end requests for data contained in its cache.

It should be appreciated that other forms of filtering besides those discussed with regard to FIGS. 4 and 5 can be used. For example, filtering can be performed to reduce load, by deleting certain requests, or by converting messages from one form to another.

Figure 6:
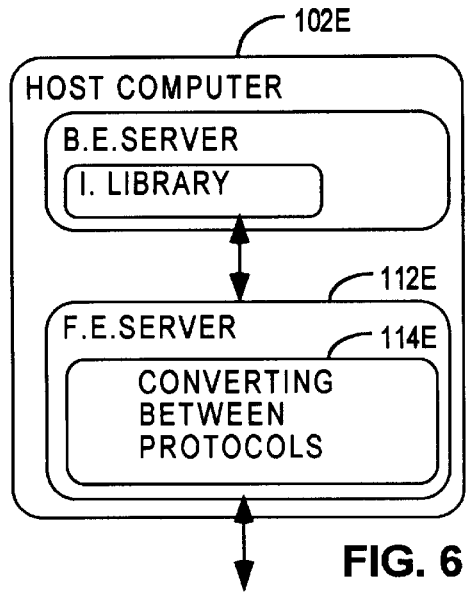

FIG. 6 shows a version 102E of the system shown in FIG. 1. Its front end 112E includes programming 114E which performs protocol conversion between the protocol used by the back end server and the protocol used by at least some of the clients which communicate with the front end server. Such a system could convert between different versions of the same protocol, such as, for example, between HTTP/1.0 and HTTP/1.1, or between entirely different protocols, such as, for example, between AppleTalk and TCP/IP. A more detailed example of a front end server that converts between HTTP/1.0 and HTTP/1.1 is set forth below with regard to FIGS. 23 and 24.

Figure 7:
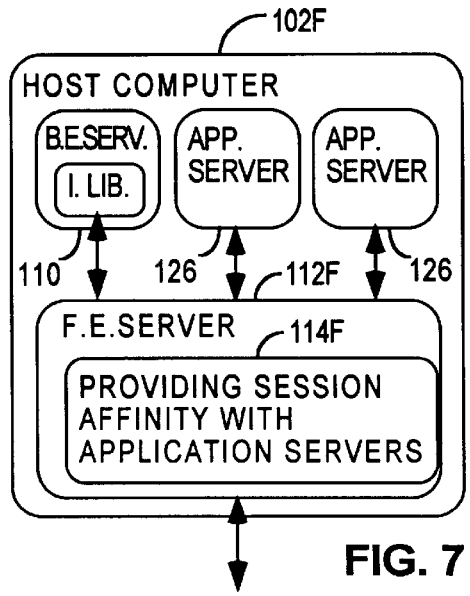

FIG. 7 shows a version 102F of the invention of FIG. 1, which has a front end 112F including programming 114F which provides session affinity between each of multiple application server processes 126 and a corresponding client. On the Web, application server processes are normally CGI processes, but the invention is meant to apply to other types of application server processes which are called by servers to handle certain types of client requests.

As was described above, session affinity is particularly useful any time a client is making multiple requests which are most efficiently treated by one application server process. This includes many purchase transactions, many complex registration transactions, and virtually any type of multi-client-request interaction in which memory of prior requests and responses is of importance. One embodiment of how the invention can be used to provide session affinity is discussed below in greater detail with regard to FIGS. 23 and 24.

Figure 8:
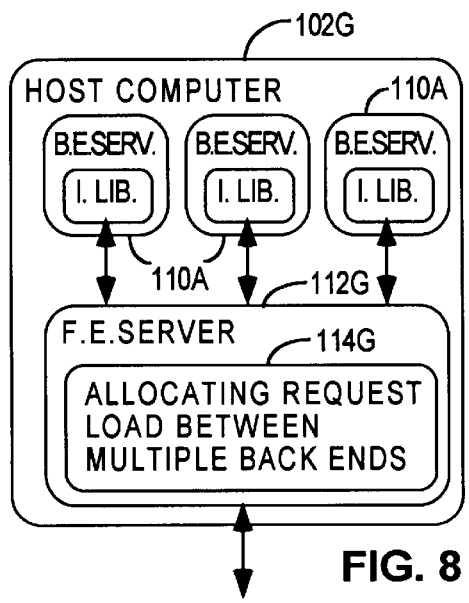

FIG. 8 shows a version 102G of the invention of FIG. 1. Its front end server 112G includes programming 114G which allocates requests between multiple back end server processes 110A. The multiple back end server processes will often be forked versions of the same back end server program. However, the different back end server processes could be processes of totally different server programs. A more detailed description of one embodiment of such a load spreading back end server program is disclosed below with regard to FIGS. 23 and 24.

Figure 9:
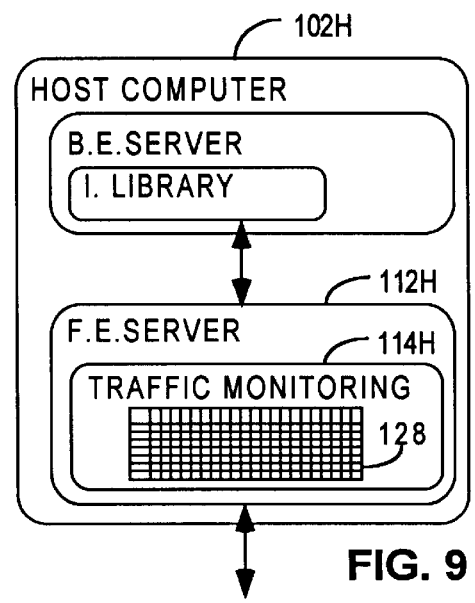

FIG. 9 shows a version 102H of the invention of FIG. 1, which includes a front end server 102H containing programming 114H which performs traffic monitoring on the traffic it receives from clients and/or its back end. It does this by updating information about such traffic in one or more data structures 128. One embodiment of such a front end server is discussed below with regard to FIG. 22.

Figure 10:
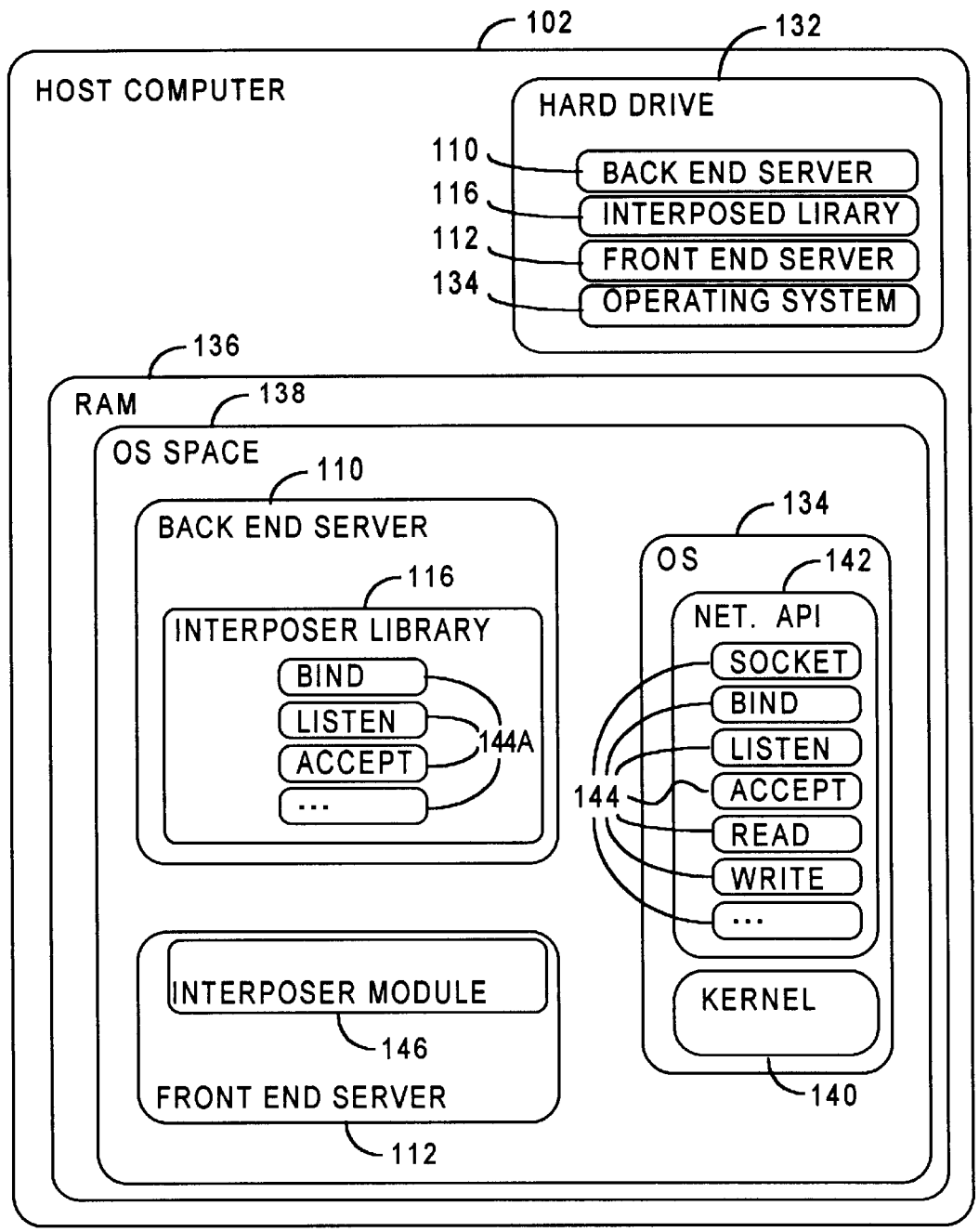
FIG. 10 is a representation of the host computer of FIG. 1 showing in greater detail some of the programming structures recorded in memory which can be used with certain embodiments of the invention.
Figure 14:
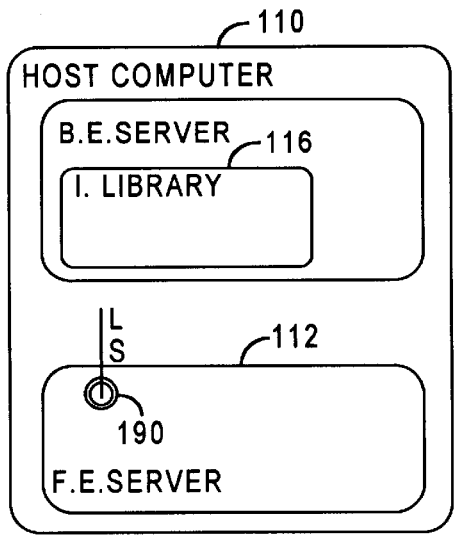
FIGS. 14–19 illustrate various connections created by the steps of FIGS. 11, 12, and 13 between the back end server, the interposed library, the front end server, and a client.

Turning now to FIG. 10, this figure provides an overview of some of the major programming elements which can be used in the computer system 102 of FIG. 1, and of the major memory spaces in which they are recorded.

The computer 102 normally will include a computer readable mass storage device, such as a hard disk 132, on which its major programs will be stored. These will include the back end server program 110, the interposed library 116, the front end server 112, and the computer's OS 134. It should be appreciated that the programming of the interposed library 116 and the front end server programming 114 can be recorded on any type of machine readable memory including not only the RAM 136, but also floppy disks (including newer versions of such disks, such as ZIP disks), CD-ROMs, DVD disks, other forms of optical storage, removable hard drive discs, electrically programmable electronic memories (including flash ROM), and MEM magnetic storage media. This software could also be sold or made available over a computer network.

The operating system ("OS") 134 is loaded in the host computer's RAM 136. It defines an OS space 138, which is a memory space controlled by a single kernel 140 of the OS. The back end and front end program 110 and 112, respectively, are loaded into this single OS space.

The back end server and the interposed library which is linked to it, are one process. The front end server is another. The OS accords each separate process its own separate subspace within the common OS space. A given process cannot directly write to another process's sub-space, but the OS does let it communicate with another processes in the same OS space through interprocess communication links, or pipes. Such pipes are defined and only work within a given OS space defined by a given OS kernel.

Although it is not mentioned elsewhere in this specification, those skilled in the computer arts will understand that the OS normally runs processes in virtual memory, i.e., a memory space larger than that which will fit in RAM at one time, and automatically swaps portions of this virtual memory space in and out of memory from and to the hard disk, as needed for current computations.

As stated above, the back end server is linked to the interposed dynamically-loaded library 116. The back end server is also linked to the library of the OS 134. As is shown in FIG. 10, the interposed library includes functions 144A, such as bind( ), listen( ), and accept( ), having some of the same names as the functions 144 contained in the OS's network library 142. Since the interposed library is linked to the back end server with a higher precedence than the OS's library, if the back end server calls a named OS function 144 for which there is a similarly named interposed library function 144A, the call will be intercepted by the interposed library function. This means the back end server process's program control will go to the interposed library function 144A, rather than to the similarly named OS function 144.

As has been described above, when a call by the back end server is intercepted by the interposed library, the library will often communicate the information contained in the call to the front end server, which responds to that information.

In many embodiments of the invention, the software within the front end server which communicates with the interposed library is placed in a separate software module 146, called the interposer module in FIG. 10. This modularization of the front end's software interface to the interposed library is not necessary to the invention, but such modularization makes programming new interposed front end servers easier.

FIG. 11 provides a highly simplified pseudo-code description of the operation of a typical prior art back end server. Although virtually any server could be used as a back end server with the current invention, including those using HTTP/1.1 and subsequent versions of HTTP, the particular back end server shown in FIG. 11 is one which uses the HTTP/1.0 protocol.

The server program shown in FIG. 11 performs a loop 149 comprised of steps 150–154 for each network service the server wishes to handle. In the TCP/IP environment network services include HTTP, FTP, SMPT, RPC, DNS, and telnet, just to name a few.

Step 150 call the OS socket( ) function to get a file descriptor for a socket to be associated with a given network service.

Then a step 152 calls the OS bind( ) function with the file descriptor to define the local end (local IP address and port number) of the network service socket. Usually the bind( ) call requests the service socket to be given the well-known port number associated with the given network service. Most of the major network services, such as HTTP, FTP, SMPT, RPC, DNS, telnet, etc. provided on TCP/IP servers are associated with well known port numbers. This enables clients to address requests for a given service to the individual port of a given server which handles the given service.

Next a step 154 calls the OS listen( ) function with the file descriptor of the given network service's socket to cause the service socket to listen for messages, including establishing an associated message queue. This causes the service's socket to function as a listen socket, i.e., one capable of receiving requests for connection from clients.

Many server programs are designed to operate with multiple processes or threads running at once. This is done so that while one process or thread is idle waiting for a call to be returned—such a call to read from disk, or a call to accept a socket connection—the server computer can perform useful work by causing other processes or threads to be executed. It is also enables the server's performance to benefit from the use of multiple processors.

A common way of running multiple processes of a server is to fork the program. Different servers fork at different times, and preferred embodiments of the invention are designed to handle back end server forking at almost any time, but a common time for forking is after the server program has established listen sockets for each of the network services it is to handle, as is shown by step 156 in FIG. 11. This step forks the program multiple times, causing multiple processes to be running multiple separate instances of the program, each with a connection to each of the established service listen sockets.

As is well known in the programming arts, a fork creates a child process, which is virtually identical to the parent process which called the fork. The child process is in a separate process space within the memory space managed by the OS kernel than is the parent process, and has copies of all the variables, data structures, and file descriptors to pipes and network communications which its parent process had. Forking can be accomplished by calling the OS fork( ) function, and it usually requires additional steps to be taken by one or both of the two forked processes to prevent them from interfering with the other's use of pipes and network communications.

Since the server 110 shown in FIG. 11, uses the HTTP/1.0 protocol, it is required to iterate through a loop 158, comprised of steps 160-170 for each separate request from a client.

Step 160 calls the OS accept( ) function with the file descriptor of a given service's listen socket. It does this to receive a connection with a remote client. If, or when, the OS has a request from a client for a connection on the service's listen socket, the accept( ) call returns with a file descriptor of a socket connected to the client and the client program's IP address and port number in an address structure pointed to by one of the accept( ) call's parameters.

The file descriptor returned by accept( ) is different from that with which it was called. The new file descriptor identifies a new socket connected directly to the client, which has a different server-end port number than the well-known port number associated with the server's listen socket. This is done so that the service's listen socket, which has the well-known port number will be available to receive connection requests from other clients, and so that every client can have a unique communication channel with the server.

Once the back end server has received the file descriptor of a socket connected to a client, step 162 calls the OS read( ) function with that file descriptor to read a request from the client over that connection. In step 166 it processes the client request, which usually involves reading it from disk. Once a response to the request is ready, step 168 calls the OS write( ) function with the file descriptor of the client connection to write the response to the client. Once this has been done, step 170 calls the OS close( ) function with the file descriptor of client connection to close the socket and client connection identified by the file descriptor.

Before the server of FIG. 11 is closed down, steps 171 and 172 call the OS close( ) function for the file descriptor of each network service listen socket originally opened by an iteration of step 150.

Referring now to FIGS. 12–19, a description will be made of how a TCP/IP back end server 110, such as that just described with regard to FIG. 11, operates in conjunction with an interposed library 116 and front server 112 according to one embodiment of the present invention. FIG. 12 (which is comprised of FIGS. 12A and 12B) illustrates some of the OS-call-intercepting functions 144A (shown in FIG. 10) in one embodiment of invention's the interposed library. FIG. 13 illustrates one embodiment of the invention's front end server. Finally, FIGS. 14–19 illustrate some of the connections created by the operation of the back end server, interposed library, and front end server of FIGS. 11–13.

When the back end calls socket( ) in step 150 of FIG. 11 to obtain a file descriptor for the listen socket associated with a given network service, that call is not intercepted by the interposed library. This is because the socket( ) call merely obtains a file descriptor pointing to an empty socket definition structure. The back end server uses this returned file descriptor in all future calls related to the service's listen socket.

However, when the back end server calls bind( ) in step 152 of FIG. 11 with the file descriptor returned by the socket( ) call and with the well-known port of a given network service, the bind( ) function 144AA of the interposed library shown in FIG. 12A intercepts the call, causing steps 174–188 of that figure to be executed.

Step 174 of the interposed bind( ) function tests to see if the port requested by the back end in the bind( )call corresponds to a network service which the front end server is intended to handle. If not, step 174 causes program flow to skip to step 188, which passes the call to the OS, ending the interposed bind( ) function's handling of call, and causing the OS to performs the bind( ) as if interposed library and front end server did not exist.

If, on the other hand, the intercepted bind( ) call specifies a port of a service to be handled by the front end, step 174 causes steps 174–186 to be executed.

Step 176 calls the OS to open an unconnected socket for future use as a control pipe for the bind( ) call's requested network service. It does this by requesting a connection from a master listen socket 190, shown in FIG. 14, located on the front end server. Just as a request by a client computer for a connection from a network service listen socket creates a connection which is not connected to the network service listen socket, the interposed library's request for a connection from the front end's master listen socket 190 creates a new connection, in this case a control pipe 192, shown in FIG. 15, which is not connected to the master listen socket.

Once the control pipe 192 has been created, step 178 calls the OS function dup2( ) to give the newly created control pipe the same file descriptor as that used by the back end server in the intercepted bind( ) call. This is done so that when the back end server makes future calls using what it thinks is the file descriptor of a network service listen socket, the library can use that file descriptor to directly access the control pipe which the library has created for the network service.

Next, step 180 adds the bind( ) call's file descriptor to list of monitored file descriptors, so that when the library intercepts a future OS call with that file descriptor, it will know that the intercepted call is for a service to be handled by the library and front end rather than directly by the OS.

Step 182 then writes a bind message through the new control pipe 192 connected between the library and the front end. The bind message contains the intercepted bind( ) call's parameters. The bind message also includes information enabling the front end to connect to the control pipe 192, shown in FIG. 15, created by the library for the network service identified in intercepted bind( ) call.

Turning now to FIG. 13, a step 194 of the front end server program 112I shown in that figure responds to the library's placement of a bind message in a control pipe by causing steps 198–204 of that program to be executed.

Step 198 of the front end, shown in FIG. 13, calls the OS socket( ) function to get a file descriptor for a listen socket to be defined for the requested network service. Step 200 associates the file descriptor of the network service's listen socket with the newly created control pipe 192. This association is indicated in FIG. 15 by a rectangle 208 which surrounds, both the socket 206A of the control pipe 192 and the network service listen socket 206B.

Note that in FIGS. 14–19 and 23 the sockets 206 which are intended to be sustained for multiple transactions are shown as double circles, and temporary sockets intended for handling the receipt and response to only one client request are represented as a single circle.

Next step 202 of the front end shown in FIG. 13 calls the OS bind( ) function with the file descriptor of the network service's listen socket 206B and the port specified by the back end server's bind( ) call, which has been relayed to it by the bind message received from the library.

Figure 15:
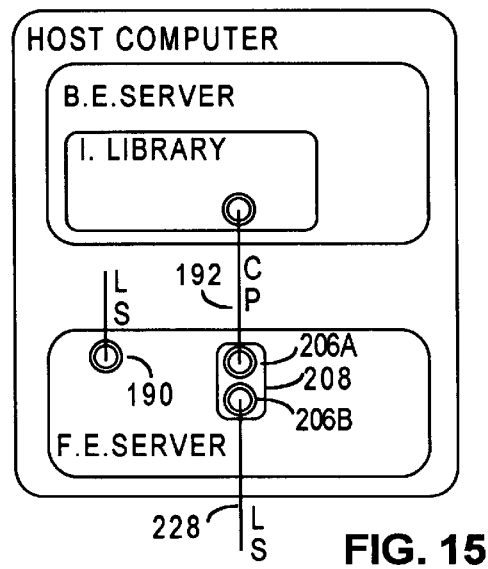

When the bind( ) call returns from the OS, step 204 of the front end writes the information provided by the OS call to the new control pipe 192, shown in FIG. 15, associated with the bind message, completing the response of the front end to the bind message.

Returning to FIG. 12A, after the results of the front end's bind( ) call have been placed in the call's associated control pipe, step 184 reads that information from the control pipe, and step 186 returns to the back end with that information in the same format as if the back end server's bind call had been executed directly by the OS. This return completes the library's response to an intercepted bind( ) call for a service handled by the front end.

When the back end calls listen( ) in step 154 of FIG. 11, that call will be intercepted by the interposed library listen ( ) function 144AB of FIG. 12A, causing steps 210–220 to be executed.

Step 210 tests to see if the call's file descriptor is on the interposed library's list of monitored file descriptors, discussed above with regard to step 180 of the library's bind( ) function. If not, the listen( ) call is for a service not being handled by the front end, and step 210 causes program flow to skip to step 22 0 which end s the execution of the library's listen( ) function by passing the listen call directly to the OS.

If, however, the listen( ) call's file descriptor is one of the library's monitored file descriptors, meaning that it is for a network service handled by the front end, steps 212–218 are executed.

Step 212 writes a listen message, with the intercepted listen( ) call's parameters, to file descriptor's associated control pipe 192, shown in FIG. 15.

FIG. 13 shows that after such a listen message is place d in a control pipe, step 222 of the front end causes steps 224–226 of that program to be performed.

Step 222 calls the OS listen( ) function using the front end-file descriptor for network service listen socket 206B (FIG. 15) associated with the control pipe socket 206A over which the listen message was received. Once this OS listen( ) call returns, step 226 of the front end writes the information returned by the OS listen( ) call to the control pipe over which the listen message was received from the library.

At this point, the service's listen socket on the front end has a queue and is available to accept connections from clients, as is indicated by the line 228 labeled "LS" for "listening socket" in FIG. 15.

Returning to FIG. 12A, step 214 of the library's listen( ) function reads the information the front end has written to the control pipe and step 218 returns to the back end with the information in the same format as if the listen( ) function had been performed directly by the OS.

When FIG. 11's back end server calls the OS accept( ) function in step 160, the call is intercepted by the interposed library's accept( ) function 144AC, shown in FIG. 12A. This function is quite similar to the library's listen( ) function described above. When it intercepts an accept( ) call, step 230 tests if the call's file descriptor is on the list of monitored file descriptors. If not, it causes step 238 to pass the call to the OS, terminating the library's execution for the call.

If the call's file descriptor has an associated control pipe, indicating it is for a network service handled by the front end, steps 232–236 are executed, starting by having step 232 write an accept message with the call's parameters to the associated control pipe.

FIG. 13 shows that after the front end has been sent such an accept message, step 240 of the front end causes steps 242–256 of that program to be executed.

Step 242 of the front end calls the OS accept( ) function using the front end's file descriptor for the network service listen socket 206B, shown in FIG. 15, associated with the control pipe 192 from which the accept message has been received. As was described above with regard to step 160 of FIG. 11, an OS accept( ) call returns with a file descriptor to a new temporary socket, in this case the temporary socket 206C, shown in FIG. 16. This enables the service's listen socket 206B to be free to receive other client connection requests. The temporary socket 206C has a compete connection 259 to a client program 104, such as a Web browser.

Figure 16:
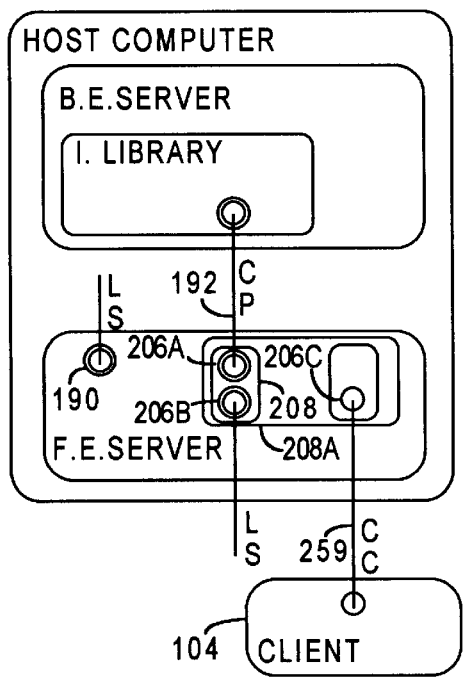

Next step 244 of the front end calls the OS to peek at the request received from the client connection 259 attached to the temporary socket 206C, shown in FIG. 16. This allows the front end to read the message without removing it from the message queue of the temporary socket 206C. Then step 246 tests to see if the client request is of a type which can be handled directly by the back end server.

If the client request can be handled by the back end directly, step 248 writes to the accept message's control pipe the information returned by the front end's accept( ) call, including the file descriptor of the temporary socket 206C, shown in FIG. 16, returned by the accept( ) call and the IP address and port number of the client's end of the client connection 259. It sends the file descriptor using the OS's method for sending a descriptor to a different process in the same OS space. As a result, the descriptor received by the other process, in this case the interposed library, while it may not be the same actual number as the descriptor sent, will point to the same socket structure in the OS kernel. Once this is done, a step 249 closes the front end's copy of the file descriptor just send, since the front end will have no further involvement with that client connection.

After this has been done steps 234 and 236 (FIG. 12A) of the interposed library will read from the accept message's associated control pipe 192, shown in FIG. 16, the information about the temporary socket 206C sent by the front end and then will return that information to the back end server in the same format as if the OS had accepted the socket 206C directly in response to an accept( ) call from the back end.

Figure 17:
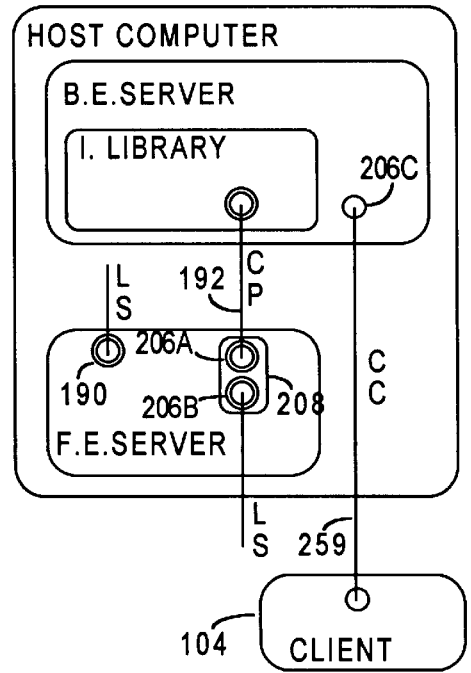

At this point the connections of the front and back end servers would be as illustrated in FIG. 17. The front end would no longer have a file descriptor connecting it to the temporary client connection socket 206C, but the back end would. This enable the back end to read the client request from, send its response to, and close the temporary client connection directly, without any further involvement by the front end.

However, if FIG. 13's step 246 determines that the client request is not one which can be handled directly by the back end server, step 250 causes steps 252–256 to be performed. Step 252 calls the OS pipe( ) function to get two file descriptor for a new back end relay pipe, one for the near end socket 258A and one for the far end socket 258B. When fully connected, this pipe would have the appearance of the relay pipe 260 labeled RP in FIG. 18.

A back end relay pipe is different than a control pipe because it is intended to enable the back end to relay communications with a client through the front end, without having to pass through an interposed library function. All the embodiments of the invention shown in the figures relay information read or written by the back end server from or to clients which passes through the front end through such back end relay pipes. However, other embodiments of the invention could relay such information between the back and front ends through the interposed library, instead.

Once FIG. 13's step 252 returns with file descriptors of both the near and far end sockets of a new back end relay pipe, step 254 associates the returned near end file descriptor of the relay pipe with the front end's temporary client connection socket 206C. This association is indicated by the rectangle 208B encircling both sockets in FIG. 18.

Next step 256 writes to the control pipe from which the current accept message being responded to by the front end was received. This write sends the far end file descriptor 258B obtained by step 252 as the file descriptor to be returned to the back end server. It also sends a simulated client IP address and port number to be placed in the address structure pointed to by a parameter included in the back end server's accept( ) call.

Returning to FIG. 12A, once the front end has written this information to the accept message's associated control pipe, steps 234 and 236 of the library's accept( ) function return it to the back end server in the format in which the OS accept( ) function returns corresponding information.

Figure 18:
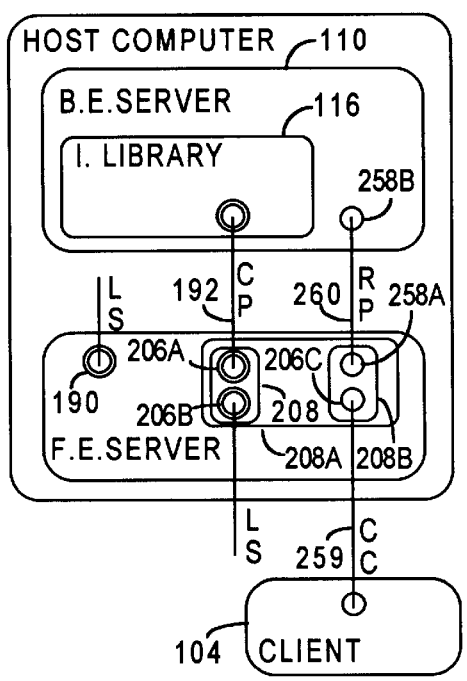

Once this is done the back end server will treat the file descriptor pointing to the far end of the relay pipe 260 shown in FIG. 18 as if it pointed to a client connection. This includes performing the read( ), write( ), and close( ) OS calls of steps 164, 168, and 170, shown in FIG. 11, with the file descriptor of the back end relay pipe. In the embodiment of the invention shown in the figures, read( ) and write( ) calls are not intercepted by the interposed library. This is indicated schematically in FIG. 18 by the fact that the back end relay pipe 260 does not originate in, or pass through, the interposed library 116.

FIG. 13 shows that if a client request is received on a client connection socket 206C having an association 208B with a back end relay pipe socket 258A, step 264 causes steps 266–270 to be performed. Step 266 reads the client request from the client connection, step 268 can perform a conversion, such as a protocol conversion, on the request if appropriate, and step 270 writes the message to the relay pipe. Once these steps have been performed, the request can be read by the back end server's read( ) call 164 shown in FIG. 11.

Once the back end server responds to a request by making the write( ) call in step 168 of FIG. 11, using the file descriptor 258B connected to the back end relay pipe 260 shown in FIG. 18, step 274 of the front end server shown in FIG. 13 will cause steps 276–282 to be performed. Step 276 will read the response from the relay pipe, step 278 will perform any appropriate conversions on the response, and step 280 will write the response to the client through the client connection socket 206C associated with the relay pipe.

Once this has been done, step 282 closes the back end relay pipe and the socket 206C connected with the client connection. This is done because the HTTP/1.0 back end server described with regard to FIG. 11 only handles one client request, and its associated response, on a given connection.

When either step 170 or 172 of the back end server of FIG. 11 call the OS close( ) function, the call is intercepted by the interposed library's close( ) function 144AD shown in FIG. 12A, causing steps 286–294 of that function to be executed.

Step 286 of the interposed library's close( ) function tests to see if the file descriptor with which the back end has made the call is one for which the library has an associated control pipe to the front end. When the back end calls close( ) in step 170 of FIG. 11, it is with the file descriptor of either a socket 206C, shown in FIG. 17, which connects directly to a client, or a socket 258B shown in FIG. 18 which connects to a relay pipe. In either case, the library has no control pipe associated with the call's file descriptor, so step 286 causes program flow to skip to step 296, which terminates execution of the library's close( ) function by passing the close call to the OS.

When the back end server calls close( ) in step 172 of FIG. 11, the current file descriptor for which the call has been made is associated with a network service listen socket. If the network service is one for which the interposed library's bind( ) function has created a control pipe, step 286 of the library's close( ) function will cause steps 287–294 to be performed. Step 287 determines if the current file descriptor is the only one associated with its control pipe on the list of monitored file descriptors maintained by the interposed library of the given back end server process making the close( ) call. This is done because multiple file descriptors can be associated by a given process's interposed library with a single control pipe, as is explained below with regard to the DUPO function of FIG. 12B. It would be inappropriate for the interposed library of a given back end server process to destroy the control pipe it associates with a given network service as long as the process's back end server has any other open file descriptors still associated with that network service. If the current file descriptor is the only one associated with its control pipe, steps 288–291 are called to close the control pipe. If not, the program skips directly to step 292.

If step 287 determines that the current file descriptor's associated control pipe is to be closed, step 288 writes a close message to the front end through that control pipe.

FIG. 13 shows that after this close message is sent, a step 300 of the front end program causes steps 301–306 of that program to be executed. Step 301 tests if the control pipe from which the close message came is the only control pipe associated with its corresponding network service listen socket. This is done because the interposed libraries of different back end server processes can each have a control pipe associated with a given front end network service listen socket, and it is not appropriate to shut down such a front end listen socket as long any of its associated control pipes is to remain open.

If the close message received is from the only control pipe associated with a given network service, steps 302–306 are performed. Step 302, closes all the front end's data structures associated with the control pipe, including the front end's associated network service listen socket 206C, shown in FIGS. 15–18. Step 304 writes the results of the close( ) call for the front end's network service listen socket to the network service's associated control pipe 192, and then step 306 closes that pipe.

Although not shown in the figure, if the close message's control pipe is not the only one associated with its network service listen socket, the front end writes a message to the close message's control pipe indicating that the associated network service listen socket is not being closed, before step 306 closes that pipe.

After the front end writes such return information to the control pipe, step 290 of FIG. 12A's interposed library's close( ) function, reads it. Step 291 closes the control pipe, step 292 removes its, and any associated file descriptors, from the list of monitored file descriptors, and step 294 ends the library's close( ) function's execution by returning to the back end with the information returned from the front end's close of the associated network service listen socket or, if the front end did not close the associated network service listen socket, with information from the interposed library's close of the control pipe in step 291.

FIG. 12B illustrate two of several interposed library functions which intercept back end server OS calls, but which do not communicate with the front end. These functions intercept such OS calls to allow the library to respond properly to certain changes in the operation of the back end which might otherwise adversely affect the interposed library's operation.

The interposed library's dup( ) function 144AE intercepts back end server dup( ) calls to the OS. A dup( ) call is made with an original file descriptor to get a new alias file descriptor identifying the same socket as the original one. The interposed library intercepts dup( ) calls so that it can keep track of all the alias which the back end has for any file descriptors associated with a network service being handled by the front end. Although not shown in the figures, the interposed library also has similar functions which intercept dup2( ) and fcnt1( ) OS function calls, since these functions can also be used to obtain aliases for file descriptors.

The interposed library's dup( ) function starts with a step 310 which tests to see if the original file descriptor for which the back end's dup( ) call is seeking an alias is on the library's list of monitored file descriptors. If not, the library has no concern with the dup( ) call and program flow skips to step 318 which ends the function's execution by passing the dup( ) call to the OS.

If the back end has called dup( ) with a monitored file descriptor, step 310 causes steps 312–316 to be performed. Step 312 makes an OS dup( ) call for the file descriptor. Step 314 records the alias file descriptor returned by the OS in the list of monitored file descriptors as a duplicate associated with the file descriptor for which dup( ) was called. Then step 316 terminates the function's execution by returning to the back end with the information returned by step 312's dup( ) call.

The interposed library's fork( ) function 144AF shown in FIG. 12B, intercepts fork( ) calls made by the back end server, such as those discussed above with regard to step 156 of FIG. 11. After a process makes a fork( ) call a new, child, process is created which has copies of all the data structures, variables and file descriptors possessed by the parent process which made the fork( ) call, exactly as they existed at the time of that call. The only difference between the two processes is that fork( ) returns to the child process with an indication that it is the child process, and to the original process with an indication that it is the parent process.

The interposed library intercepts fork( ) call by the back end server processes because such calls not only duplicate the back end server process, but also the copy of the interposed library which is part of each such back end process. Thus, as a result of such a fork there will be a separate interposed library in each of the two resulting back end server processes, each having identical file descriptors to the same control pipes with the front end. Attempts by each such process to communicate over the same control pipe at the same time could result in undesirable problems.

When the interposed library's fork function 144AF intercepts a back end fork( ) call, steps 320–332 of FIG. 12B are performed. Step 320 makes a fork( ) call to the OS. After this call, there are two processes executing the remainder of the interposed library's fork( ) function. In each such process, step 322 tests to see if the process is the parent or child of the fork. If the return value from the fork( ) call indicates its process is the parent process, step 322 causes program control to skip to step 332 which merely returns to the associated back end server process with the information returned by the fork( ) call of step 320. If the process is the child of the fork, step 322 causes steps 324–330 to be performed.

Step 324 performs a loop comprised of steps 326–330 for each file descriptor in the list of monitored file descriptors.

Figure 19:
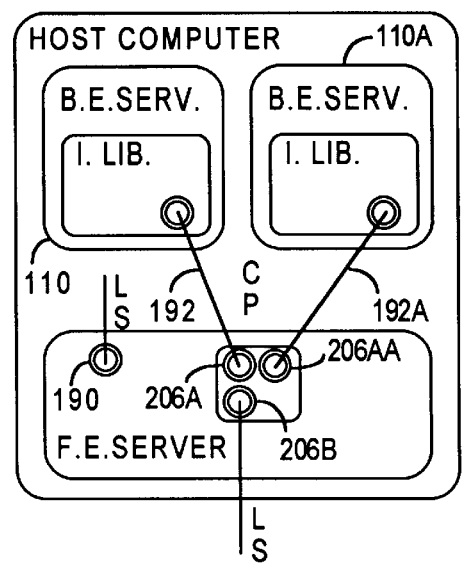

If the current file descriptor for which an iteration of loop 324 is being performed is the first file descriptor in the list of monitored file descriptors associated with a given control pipe, step 326 creates a new control pipe 192A, shown in FIG. 19, for the service. Since this new pipe is being created by the child process, the parent process has no connection to it. This new pipe is only created for the first file descriptor associated with a given control pipe, so that even if, as a result of prior dup( ) or similar calls, there are multiple file descriptors identifying a given control pipe, only one duplicate of that pipe will be made.

Step 328 calls the OS to close the current file descriptor, which before this call was connected to the same control pipe as is the identical file descriptor in the parent process. Then step 330 calls the OS dup2( ) function to get a file descriptor having the same number as the file descriptor just closed, but which points to the child process's new control pipe. It also deletes the file descriptor originally returned when the new control pipe was opened.

Once this is done both the parent and child back end server processes resulting from the fork will be able to make calls using the identically numbered file descriptors which each of the back end processes associates with a given network service listen socket. Each of their interposed libraries will associate that file descriptor number with a different control pipe to the front end which is associated with the given network service. FIG. 19 illustrates the state of connections between two back end server processes having one network service handled by the front end, after step 330 is complete.

After the loop 324 has been performed for each monitored file descriptor, step 332 completes execution of the interposed library's fork( ) function for a given one of the two processes created by the fork( ), by returning to the back end server code in the given process which made the back end program's fork( ) call with the information returned to the given process by interposed library's fork( ) call.

Although not shown in the figures, the interposed library can also monitor other OS calls by the back end which might effect, or change the file descriptors or properties associated with connection between the library and front end.

FIGS. 20–24 describe a few of the many possible embodiments of the invention which can add capability to a back end server. The simplified description of a front end server made above with regard to FIG. 13, focused mainly on how a front end server can be interposed between a back end server and clients without requiring reconfiguration of the back end server. It almost totally skips describing the programming for providing added capability 114, shown in FIG. 1, that such a front end server can provide.

FIG. 20 provides a simplified illustration of the changes which can be made to the front end server of FIG. 13 to create an embodiment 112AA of the caching front end server 112A shown in FIG. 2. These include changing the steps executed when step 240 of FIG. 13 responds to an accept message on a control pipe and the steps executed when step 274 of FIG. 13 receives a response on a back end relay pipe. Although not shown in FIG. 20, the front end 112AA performs all of the other steps described above with regard to FIG. 13.

When the caching front end 112AA of FIG. 20 receives an accept message from a relay pipe issued by the interposed library's accept( ) function in response to an intercepted back end accept( ) call, the front end 112AA performs steps 240, 242, and 244 just as does the front end program described above with regard to FIG. 13. That is, it calls the OS accept( ) function with the accept message's file descriptor, and then it peeks to the client connection returned by the accept( ) call to read the client request received on that connection. But, after this is done, instead of performing steps 246–256 of FIG. 13, the caching front end server 122AA performs steps 340–358, shown underlined in FIG. 20.

Step 340 determines whether or not the client request peeked at in step 244 is for a cachable data object. Cachable data objects would normally include most data object which can be read from disk and which are not often changed. Non-cachable data objects include responses from a CGI script or data objects which are constantly being changed. The front end can normally determine whether a requested data object is cachable from the path specification in the URL contained in its request.

If the request is for a cachable data object, step 340 cause steps 342–354 to be performed. Step 342 tests to see if the requested data object is in the front end's cache. If so, it causes step 344 to write the data object to the client connection, and step 346 to close the client connection (assuming the client is an HTTP/1.0 client). If step 342 finds the requested data object is not cached, step 348 causes steps 350–354 to be performed. These three steps are identical to steps 252–256 of FIG. 13, discussed above. They open a new relay pipe to the back end server making the accept( ) request, associate the relay pipes with the client connection accepted by the front end in step 242, and write the far end file descriptor of the relay pipe to the control pipe from which the accept message was received, so that descriptor can be returned by the interposed library to the back end server as if it were the file descriptor of a socket to a client connection.

If, however, the client request is not for a cachable data object, step 356 cause step 358 to be performed. Step 358 performs the same function as step 248 of FIG. 13, described above. That is, it writes the file descriptor of the client connection received by the front end in step 242 to the control pipe over which the accept message was received for return by the interposed library, so the back end server will be able to read the client request and respond to it directly with the client.

The caching front end 112AA responds to client requests for cachable data objects not currently cached, with steps 264–270 of FIG. 13, which read each such request from its associated client connection and write it to the associated back end relay pipe created for that request by steps 350-354, described above.

When the back end server has received the file descriptor sent to it by step 354 of FIG. 20, it will make a read( ) call with this descriptor. The will read the request which the front end had written to the relay pipe in step 270 of FIG. 13. Once the back end has a chance to prepare a response to the request, it call writes( ) with the relay pipe's file descriptor, and writes the requested cachable data to that pipe.

Once this is done, step 274 of FIG. 20, causes steps 276–282 to be perform, which are identical to the same numbered steps in FIG. 13. They read the response from the relay pipe, write the respond to the associated client connection, and close the relay pipe and client connection. But in addition, it performs the additional steps 360 which writes the cachable data object in the front end's cache, so that it will be available for use in more rapid response to future requests.

FIG. 21 illustrates changes which can be made to the front end server of FIG. 13 to create an embodiment 112CA of the front end server 112C shown in FIG. 2 which filters client requests based on information about the requesting client. These changes include the insertion of added steps 370–376 shown in underlining in FIG. 21 to the code executed when step 240 of FIG. 13 responds to an accept message on a control pipe, by causing steps 240–256 to be performed. Although not shown in FIG. 21, the front end 112CA performs all of the steps described above with regard to FIG. 13 which are not shown in FIG. 21.

FIG. 21's added step 370 is performed after step 242's accept( ) call to OS has returned with a file descriptor of a temporary client connection and with information about the client's IP address and port number in an address structure pointed to by a parameter of the accept( ) call. Step 370 tests to see if either client IP address or port number identified in this address structure is one which a data structure associated with the front end 112CA identifies as being a non-allowed client of the server. If the client is non-allowed, steps 372 writes a message to the client connection informing the client that it is not allowed access. This would normally be done after first reading the client's request, to ensure the response sent to the client is proper. Then step 374 closes the recently accepted client connection.

If step 370 determines that the client is an allowed client, step 376 causes steps 244–256 to complete the response to the accept message in the same manner as was discussed above with regard to FIG. 13.

FIG. 22 illustrates changes which can be made to the front end server of FIG. 13 to create an embodiment 112HA of the traffic monitoring front end server 112H shown in FIG. 2. These include the insertion of the added step 380, shown in underlining in FIG. 22, into the code executed when step 240 of FIG. 13 responds to an accept message on a control pipe.

This added step 380 uses information about the IP address or port of the client, about the local port number of the listen socket on which the request has been received, about the header of the message, and/or about the actual client request obtained by the peek performed in step 244 to update one or more traffic record data structures, such as the data structure 128 shown in FIG. 9.

Although not shown in FIG. 22, the front end 112HA performs all of the steps described above with regard to FIG. 13 which are not shown in FIG. 22.

Figure 23:
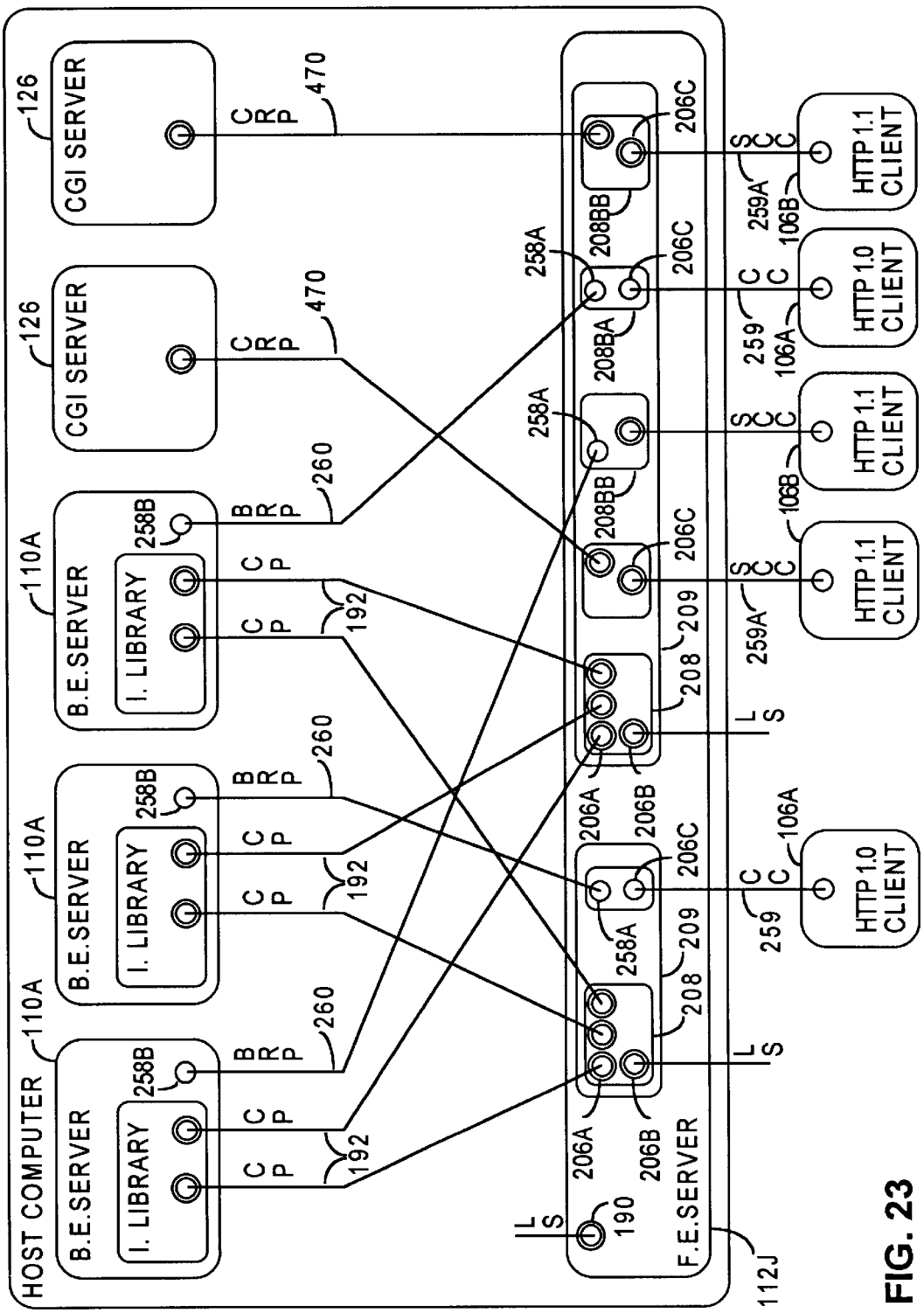
FIG. 23 illustrates some of the connections used by a front end server which interfaces between clients using HTTP/1.1 and a back end program using HTTP/1.0, which provides session affinity between sustained client connections and associated processes of a CGI server, and which allocates load between multiple processes of the back end server.

FIGS. 23 and 24 illustrate a front end server 112J which is capable of performing protocol conversion, providing session affinity, and spreading load between multiple back end server processes, as was described above with regards to FIGS. 6, 7, and 8, respectively.

The front end server 112J provides protocol conversion between HTTP/1.0 and HTTP/1.1. It communicates with back end server processes 110A shown in FIG. 23 which uses the HTTP/1.0 protocol, in which each separate client request is handled on a separate client connection. The front end is not only capable of communicating with clients 106A which use the same HTTP/1.0 protocol as the back end server processes, but with clients 106B which use the HTTP/1.1 protocol, in which a client can issue multiple requests on one sustained client connection 259A. When the front end receives such multiple requests from a sustained client connection, for each such request the front end: creates a separate back end relay pipe 260; sends the far end file descriptor 258B of that pipe to the library to be returned to a back end accept( ) call; writes the client request from the sustained client connection to the back end relay pipe, converting the format of its header to account for differences in protocol; reads the back end server's response from the back end relay pipe and writes it to the sustained client connection, after performing protocol conversion on its header, and closes the back end relay pipe.

The front end server 112J provides session affinity between a sustained HTTP/1.1 client connection and a sustained process 126, shown in FIG. 23, of a CGI server program, which is capable of creating a separate sustained CGI process for servicing a sequence of requests with a given client. Such CGI servers are commonly referred to as fast CGI servers. Fast CGI servers are well knowing in the art of Web server operation, and are available from the assignee of this application, Fast Engines, Inc., 675 Massachusetts Avenue, Cambridge, Mass. 02139, as well as from multiple other sources, including the collaborative software development effort known as the Apache Group (www.apache.org) and Open Market, Inc., 1 Wayside Road, Burlington, Mass. 01803.

As was described above with regard to FIG. 7, such session affinity greatly improves the performance of handling a transaction with clients which involve multiple interrelated interactions, such as shopping for and purchasing a plurality of goods with one payment.

The front end server 112J also provides load spreading between multiple back end server processes 110A, shown in FIG. 23, such as those created by used of the fork( ) function 144AF of the interposed library discussed above with regard to FIG. 12B. It does this by allocating client requests from a given front end service listen socket 206B to such different back end processes in the order in which accept messages to that listen socket are received from the different back end processes, so as to allocate such messages to the servers that are ready to handle them.

FIG. 24 illustrates the changes which can be made to the front end server of FIG. 13 to create the front end server 112J shown schematically in FIG. 23. These include replacing steps 240–256 of FIG. 13 which respond to accept messages with new steps 390–414; adding new steps 420–440 for responding to one or more HTTP/1.1 requests from a sustained client connection, and replacing FIG. 13's steps 274–282 which respond to responses received over back end relay pipes with new steps 450–464 which respond to requests received over both back end relay pipes and relay pipes connected to CGI server processes. Although not shown in FIG. 20, the front end 112J performs all of the steps described above with regard to FIG. 13 except for replaced steps 240–256 and steps 274–282 just mentioned.

The front end server 112J responds to the receipt of an accept message on one of the control pipes 192 from a back end server process 110A associated with a given network service's listen socket 206B, by causing step 392–414 to be performed for the accept message.

Step 392 checks to see if there is currently a client request on a converted request queue. This is the queue on which steps 420–440, described below, place the one or more client requests which have been received over each HTTP/1.1 connection that the front end has determines are to be handled by the HTTP/1.0 back end, after converting the format of each such request to the HTTP/1.0 standard.

If there is a converted request from an HTTP/1.1 client in the converted request queue, step 392 causes steps 394–400 to be performed.

The first three of these steps, steps 394–398 are identical to steps 252–256 discussed above with regard to FIG. 13. Step 394 opens a new back end relay pipe. Step 396 associates the relay pipe's near end file descriptor 258A with the sustained client socket 206C from which the message came. This association is indicated by the rectangle 208BA shown in FIG. 23. Step 398 writes to the control pipe from which the current accept message was received the far end file descriptor 258B of the new back end relay pipe, to be returned by that control pipe's associated interposed library to its associated back end server process.

Then a new step, step 400, writes the converted HTTP/1.1 request to the newly established relay pipe, so it can be obtained by the back end server process with a subsequent read( ) call using the relay pipe's far end file descriptor 258B.

If the test of step 392 finds that there are no client requests in the converted request queue, step 402 causes steps 404–414 to be performed.

Step 404 calls the OS accept( ) function using the file descriptor of the front end service listen socket 206B associated with the control pipe from which the accept message was received. Next step 406 calls peek( ) to determine if the client connection just received is an HTTP/1.0 or an HTTP/1.1 connection. If it is a 1.0 connection step 408 causes steps 410 to be performed, which respond to the accepted connection in a manner similar to the response to such connections in FIGS. 13, 21, or 22, discussed above. This includes writing the file descriptor of either the client connection or of a back end relay pipe to the control pipe on which the accept message being handled was received, for return to the message's associated back end server process.

If the new client connection is a 1.1 connection, steps 412 and 414 cause the accepted connection to be marked as a sustained (or 1.1) connection and associate it with the accept message's associated network service listen socket 206B. In FIG. 23 the association of a sustained client connection with a given network service is indicated by the rectangles 209.

Referring now to steps 420–440, step 420 activates steps 422–440 in response to each HTTP/1.1 client request received on one of the sustained client connections established by step 404 and 414, just described.

Step 422 reads the client request from the connection. If the request is for CGI service, step 428 causes steps 430–433 to be performed. Step 428 checks if a CGI relay pipe 470 has already been associated with the sustained client connection. In FIG. 23 this connection is indicated by the rectangle 208BB.

If the sustained client connection from which the current CGI request came, does not already have a CGI relay pipe associated with it, Step 430 opens a new CGI relay pipe 470. Step 432 sends instructions to a process 126 of the CGI server program to fork a new process to handle the sustained client connection and to connect to the new CGI relay pipe. Then step 433 records an association 208BB between the newly created CGI relay pipe and the sustained connection.

When the current CGI request's sustained client connection has an associated CGI relay pipe, created by steps 430–433 either in response to this or a prior CGI request from the sustained client connection, step 434 writes the current CGI request to its associated CGI relay pipe, and the processing the CGI client request is complete.

If the test of step 426 finds that the current client request is not a CGI request, step 436 causes steps 438 and 440 to be performed. Step 438 translates the request's HTTP/1.1 header into the proper format for a corresponding HTTP/1.0 header. Then step 440 places the converted client request into the converted request queue for the sustained client connection's associated network service. This enables the request to be subsequently communicated to a back end server process by steps 392–400, discussed above.

Now let us turn to steps 450–464. Step 450, causes the rest of these steps to be performed when there is a response in a relay pipe, either a back end relay pipe 260 or a CGI relay pipe 470. Step 452 reads the response from the relay pipe. If the request has been read from a back end relay pipe, and if that pipe is associated with a sustained client connection, step 454 and 456 perform protocol conversion on the request by converting its header from the format of a HTTP/1.0 header to that of a corresponding HTTP/1.1 headers. Whether or not step 456 is performed, step 458 then writes the response out to the client connection, whether it be an 1.0 or and 1.1 connection, associated with its relay pipe. Then, if the request's relay pipe is a back end relay pipe, steps 460 and 462 close the relay pipe, because the HTTP/1.0 back end server processes can only use such a pipe for one request/response cycle.

Although not shown in FIGS. 23 and 24, HTTP/1.1 sustained client connections can be shut down by either side of that connection, and can be caused to time out after a specified period of inactivity. When such a sustained connection is closed, its associated relay pipe would normally also be closed.

It can be seen that the invention described above and in the claims below, provides an easy way of adding one or more different capabilities to a server program, by interposing a front end server which communicates with the original server through an interposed dynamically-loaded library.

It should be understood that the foregoing description and drawings are given merely to explain and illustrate the invention and that the invention is not limited thereto, except insofar as the interpretation of the appended claims are so limited. Those skilled in the art who have the disclosure before them will be able to make modifications and variations therein without departing from the scope of the invention.

For example, it should be understood that the invention of the present application, as broadly claimed, is not limited to use with any one type of OS, computer hardware, or network protocol. For instance, most of the more detailed discussions of the invention above describe front and back end servers using the TCP/IP protocol, and on occasion describe UNIX OS commands. As stated above, however, other embodiments of the invention could use many different types of protocols, many different TCP layer network interfaces, a network service layer other than TCP, many different OSs, including without limitation Microsoft NT, Linux, and Sun Microsystems' Solaris. Thus, when the claims below refer to a particular type of call or function, the claims are not limited to corresponding TCP/IP or UNIX calls disclosed above, but rather are meant to cover any network interface call operating under any OS having the behavior defined for the call in the claims.

When the claims refer to OS calls, that is meant to include any call to the networking stack of a computer system, even if that stack is one which has been added to the OS by a third party vendor, or even if the call is not directly to the OS, but is made to the OS through a function, including, without limitation, functions contained in a library for interfacing between a given programming language and the OS.

Although much of the discussion above has been focused on World Wide Web servers, it should be understood, as mentioned above, that it is equally applicable to mail servers, FTP servers, and any other type of client-server computing. It should also be understood that the invention can be used not only on the Internet, but also with other forms of computer networks, including local area networks and wide area networks.

It should be understood that the behavior described in the claims below, like virtually all computer behaviors, can be performed by many different programming and data structures, using substantially different organization and sequencing. This is because programming is an extremely flexible art in which a given idea of any complexity, once understood by those skilled in the art, can be manifested in a virtually unlimited number of ways. Thus, the claims are not meant to be limited to the exact steps and sequence of steps described in the figures.

This particularly true since the pseudo-code described in the text above has been highly simplified to enable it to more efficiently communicate that which one skilled in the art needs to know to implement the invention without burdening him or her with unnecessary details. In the interest of such simplification the structure of the pseudo-code describe above often differs significantly from the structure of the actual code that a skilled programmer would probably want to use when implementing the invention.

For example, skilled programmers will often want to make the front end servers of the invention use different control schemes than those described above. For example, the simplified control scheme shown in FIG. 24 will not receive any new client connections as long as it has un-serviced, previously received client requests in its converted request queue. In some embodiments, such a simplified scheme might be acceptable, but customers might prefer a more complicated control scheme which would more evenly share the front end's attention between old and new connections. For example, in some embodiments of the invention, a multi-threaded or event driven architecture could be used to allow asynchronous responses to various events, including, without limitation, the receipt of message's from the interposed library, connections with clients, requests from clients, and responses from the back end.

It should also be understood that other embodiments of the invention could use other methods to achieve session affinity between processes on an application server and requests from a given client. For example, the front end sever could use well known techniques such as cookies, or mini-servers, to provide session affinity with CGI processes or threads, particularly with clients using a protocol such as HTTP/1.0 which do not enable sustained network connections with clients. In some embodiments of the invention, the CGI server and the front end server might actually be integrated into one program, which could either fork or use multiple threads to provide separate CGI sessions.

As discussed above, a major benefits of the present invention is that its use of an interposed library to communicate between a back end server and an interposed front end enables the front end server to be used without requiring any reconfiguration of the back end other than linking the interposed library to it. It should be understood, however, that in some embodiments of the invention it might be desired or necessary to have the operation of the interposed library or the front end be such that some reconfiguration is required for the back end. For example, in some embodiments of the invention, the back end might be designed so that it can selectively cause a desired front end to be loaded so as to dynamically change its system's functionality.

In the embodiments shown above the interposed library creates a separate pipe to the front end for each network service being handled for it by the front end. In other embodiments, one such pipe could be used for multiple different network services. Also, if desired, read( ) and write( ) type functions could be intercepted by the interposed library and their associated messages could be send over one or more pipes between the interposed library and the front end.

Furthermore, many of the functions which are shown being performed in software in the specification could be performed in hardware in other embodiments.

What we claim is:

1. Computer programming recorded in computer readable memory designed to be used on a host computer system having an operating system including calls for communicating with remote client programs running on other computer systems connected to the host over a computer network, said programming comprising a dynamically-loaded library which includes:

programming which enables the library to intercept certain standard operating system calls made by a back end server program running in the same operating system space as the library, including programming which causes the library to intercept a standard accept call from the back end server which instructs the operating system to accept a connection from a remote client over the computer network;

programming which responds to the intercept of such an accept call by communicating, through a pipe, a representation of the accept call and its parameters to a front end server program running as a separate process in the same operating system space as the library;

programming which receives from the front end server, over a pipe, a socket associated with a connection with a remote client established by the front end server; and programming which returns program flow from the library's execution of the accept call back to the back end server with information specifying the socket received from the front end server in the same format in which the operating system returns socket information in response to an accept call.

2. Computer programming as in claim 1:

which includes the front end server program; and wherein the front end server program includes:

programming which sends to the library, as said socket to be returned to the back end server's accept call, a socket connected to a relay pipe, which connects to the front end server; and programming which receives data sent by the back end server over the relay pipe by sending corresponding data to the socket's associated remote client over the connection which the front end server has accepted from the client.

3. Computer programming as in claim 2, wherein the front end server further includes:

programming which sends to the library, as the socket to be returned to the back end server's accept call, a socket which connects directly to the client, so the back end server can communicate directly with the client without sending communications through the front end server; and programming which determines, in response to a communication from a given remote client which of said two different types of sockets to send to the library in association with the given client, the socket which connects to a relay pipe or the socket which connects directly to the client.

4. Computer programming as in claim 1 further including programming in the library which intercepts an operating system calls from the back end server to establish a network service listen socket using a given file descriptor, and responds to such a call by sending communications to the front end which causes the front end to establish a listen socket for the same network service and by associating the resulting front end network service listen socket with the given back end server file descriptor;

programming which determines if subsequent intercepted calls from the back end server should be communicated to the front end's network service listen socket, based on whether the file descriptor used in the intercepted call is one associated with the network service listen socket; and programming in the library which intercepts operating system calls from the back end server which seeks an alias file descriptor for said given file descriptor, as responds to such a call by making a corresponding call to the operating system for such an alias file descriptor, by associating the alias file descriptor returned by the operating system with the given front end network service listen socket, and by then returning the alias file descriptor to the back end server;

so that when the library intercepts a call from the back end server using the alias file descriptor it programming which determines if the call should be communicated to the front end's network service listen socket will know the alias file descriptor is associated with the network service listen socket.

5. Computer programming as in claim 1:

which includes the front end server program; and wherein the front end server program includes programming which sends to the library, as the socket to be returned to the back end server's accept call, a socket which connects directly to the client, so the back end server can communicate directly with the client without sending communications through the front end server.

6. A computerized method for interposing a front end server between a back end server program running in a given operating system space on a given computer and one or more client programs running on remote computers connected to the given computer via a computer network, comprising:

running an interposed dynamically-loaded library which is linked to the back end server in the given operating system space;

running a front end server program which is loaded in the given operating system space;

using the library to respond to standard operating system calls by the back end server, including using the library to respond to an operating system call by the back end server to accept a connection from a remote client by communicating the call and its parameters to the front end server over a first pipe;

using the font end server to accept a connection from a remote client;

using the font end server to communicate a socket associated with the client connection to the library; and using the library to return program flow from the library's execution of the accept call back to the back end server with information specifying the socket received from the front end server in the same format in which the operating system returns socket information in response to an accept call.

7. A computerized method as in claim 6 further including using the front end server to:

maintain a cache of data objects requested by clients;

respond to a request by a client for a certain data object, by determining whether or not the requested data object is currently stored in the cache;

respond to a determination that the requested data object is in the cache, by sending a copy of the requested object from the cache to the client over the front end server's connection with the client;

respond to a determination that the requested data object is not in the cache by using the front end server to:

send to the library, as the socket to be returned in response to the back end server's accept call, a socket connected to a relay pipe, which connects to the front end server; and send to the back end server the client's request for the data object; and respond to a data object received through the relay pipe from the back end server in response to the client's request by caching the data object and sending it out to the client over the front end server's connection with the client.

8. A computerized method as in claim 7 wherein the front end server's response to a determination that the requested data object is in the cache does not include sending to the library, as the socket to be returned in response to the back end server's accept call, a socket associated with the client's requests or sending to back end server the client request.

9. A computerized method as in claim 7 wherein the front end server performs the steps of:

responding to a request from a client by determining if the requested data object is of a type to be stored in the cache; and responding to a determination that the requested data object is of a not of a type to be stored in the cache by sending to the library, as the socket to be returned in response to the back end server's accept call, a socket connected directly to the client, so the back end server can respond to the request by sending the requested data object directly to the client.

10. A computerized method as in claim 6 wherein:

the back end server calls the library and makes calls using the socket returned to it by the library using a first network protocol;

the front end server responds to those calls by the back end server and sends sockets and other communications to the back end server using the first network protocol;

the front end server accepts communication from and communicates with remote clients using a second network protocol; and the front end server performs protocol conversion when relaying connections and communications between the back end server and remote clients.

11. A computerized method as in claim 10 wherein the second network protocol with which the front end server communicates with clients is a newer version of the first protocol with which the back end server communicates with the front end server.

12. A computerized method as in claim 10 wherein the first network protocol used by the back end server uses a separate socket to receive and respond to each separate request from a given client;

the second network protocol used by a client allows a client to make multiple requests over a single sustained socket with a server; and the front end server accepts multiple requests from a given client over a single sustained connection defined by a single sustained socket and for each of the multiple requests, the front end server:
  sends to the library, as the socket to be returned to a back end server's accept call, a separate socket associated with the individual request, which is connected to an associated separate relay pipe connected to the front end server;
  sends the individual request to the back end server over the request's associated relay pipe;
  receives the back end server's response to the individual request over the request's associated relay pipe; and
  sends the request's response to the client over the single sustained connection.

13. A computerized method as in claim 6:
further including the step of having application server programming loaded in the given operating system space for providing a given type of service to clients, which application server programming is capable of running multiple sustained processes, each capable of responding to multiple separate requests for the given type of service from a given client; and
the front end server causes multiple requests for the given type of service from a given client to be sent directly to the same process of the application server programming without passing through the back end server.

14. A computerized method as in claim 6 wherein the front end server filters communications between clients and the back end server.

15. A computerized method as in claim 14 wherein the front end server selects whether or not to relay a communication from a client to the back end server based on information about the client.

16. A computerized method as in claim 14 wherein the front end server selects whether or not to relay a request from a client to the back end server based on the type of request made by the client.

17. A computerized method as in claim 6 wherein the font end server maintains data structures which record information about communications with client, and the front end server updates those data structures in response to new communications with clients.

18. A computerized method as in claim 6 wherein:
multiple back end server processes are run in the given operating system space, each of which is linked to the library;
the library intercepts standard operating system calls by each of the multiple back end servers, including responding to accept calls from each back end server by communicating the call and its parameters to the front end server;
the front end server accepts a plurality of connections and associated requests from clients, and associates a socket with each such connection; and
either the library or the front end server allocates the sockets associated with the different client connections between the back end servers, causing the library to return sockets associated with different client connections to the accept calls of different back end servers, so as to spread the load of responding to multiple client requests between the back end servers.

19. A computer system for serving requests from remote clients connected to the system over a computer network, the system comprising:
operating system programming loaded in memory and providing a given operating system space within that memory;
a back end server program loaded in the given operating system space;
an interposed dynamically-loaded library loaded in the given operating system space and linked to the back end server; and
a front end server program loaded in the given operating system space;
wherein:
  the library includes programming which responds to standard operating system calls by the back end server, including programming which responds to a call by the back end server to accept a connection from a remote client by communicating the call and its parameters to the font end server through a pipe between the library and the front end server;
  the front end server includes:
    programming which accepts a connection from a remote client; and
    programming which communicates a socket associated with the client connection to the library through a pipe between the front end server and the library; and
  the library further includes programming which returns program flow from the library's execution of the accept call back to the back end server with information specifying the socket received from the front end server in the same format in which the operating system returns socket information in response to an accept call.

20. A computer system as in claim 19 wherein the front end server further includes:
programming which sends to the library, as the socket to be returned to the back end server's accept call, a socket connected to a relay pipe, which is connected to the front end server; and
programming which responds to a request received from a client over the front end server's connection with the client by relaying that request over the relay pipe; and
programming which responds to a response to the request received from the back end server over the relay pipe by relaying that response over the front end server's connection with the client.

21. A computer system as in claim 20 wherein:
the back end server includes programming which issues separate operating system calls to read and write data using the socket returned to the back end server in response to an accept call;
the front end server programming which relays a request received from a client over the relay pipe includes:
  programming which issues operating system calls to read data from the connection with the remote client; and
  programming which writes corresponding data to the relay pipe, so the corresponding data can be received by the back end server in response to a read call made by the back end server using the socket connected to the relay pipe; and
the front end server programming which relays a response received from the back end server to the client includes:
  programming which issues operating system calls to read data from the relay pipe, to read data placed in the relay pipe by a write call made by the back end server using the socket connected to the relay pipe; and
  programming which writes corresponding data to the connection with the remote client.

22. A computer system as in claim 20 wherein the front end server further includes:

programming which sends to the library, as the socket to be returned to the back end server's accept call, a socket which connects directly to the client, so the back end server can communicate directly with the client without sending communications through the front end server; and programming which determines, in response to a communication from a given remote client which of said two different types of sockets to send to the library in association with the given communication, the socket which connects to the relay pipe or the socket which connects directly to the client.

23. Computer system as in claim 19 wherein the library further includes:

programming in the library which intercepts of an operating system calls from the back end server to establish a network service listen socket using a given file descriptor, and responds to such a call by sending communications to the front end which causes the front end to establish a listen socket for the same network service and by associating the resulting front end network service listen socket with the given back end server file descriptor;

programming which determines if subsequent intercepted calls from the back end server should be communicated to the front end's network service listen socket, based on whether the file descriptor used in the intercepted call is one associated with the network service listen socket; and programming in the library which intercepts operating system calls from the back end server which seek an alias file descriptor for said given file descriptor, as responds to such a call by making a corresponding call to the operating system for such an alias file descriptor, by associating the alias file descriptor returned by the operating system with the given front end network service listen socket, and by then returning the alias file descriptor to the back end server;

so that when the library intercepts a call from the back end server using the alias file descriptor it programming which determines if the call should be communicated to the front end's network service listen socket will know the alias file descriptor is associated with the network service listen socket.

24. A computer system as in claim 19 wherein the front end server further includes programming which sends to the library, as the socket to be returned to the back end server's accept call, a socket which connects directly to the client, so the back end server can communicate directly with the client without sending communications through the front end server.

25. A computer system as in claim 19 wherein:

the front end server further includes:

programming which receives a client requests over a connection the front end server has accepted from a remote client; and programming which determines, based on the received request, whether or not the request should be communicated to the back end server; and wherein the programming which communicates the socket associated with a client connection to the library includes programming:

which delays such communication until after the determination of whether or not the client request received on the connection should be communicated to the back end server; and which only communicates the socket associated with the client connection to the library when said determination indicates the client request should be communicated to the back end server.

26. A computer system as in claim 19 wherein the front end server further includes:

programming which receives requests from clients over the front end server's connections with such clients, including requests for cachable data objects;

a cache of cachable data objects requested by clients;

programming which determines whether or not a requested cachable data object is currently stored in the cache; and programming which responds to a determination that the requested cachable data object is in the cache, by sending a copy of the requested data object from the cache to the requesting client over the front end server's connection with said client; and programming which responds to a determination that the requested cachable data object is not in the cache, including:

programming which causes the socket sent to the library for return to a back end server's accept call to be connected to a relay pipe, which is connected to the front end server;

programming which causes the client request for the data object to be communicated over the relay pipe; and programming which receives the requested data object received from the back end server over the relay pipe in response to the client request;

programming which caches the received data object; and programming which sends the received data object over the front end server's connection with the client.

27. A computer system as in claim 26 wherein the front end server further includes programming which responds to receipt of a client request which is for a non-cachable response by causing the socket sent to the library for return to the back end server's accept call to be connected directly to the client, so the back end server can make the non-cachable response directly to the client without the need to relay it through the front end server.

28. A computer system as in claim 19 further including application server programming loaded in the given operating system space, which application server programming is capable of running sustained processes, each of which is capable of responding to each of multiple requests for a given type of service from a given client; and the front end server further includes programming which causes multiple requests for the given type of service from a given client to be sent to the same process of said application server programming.

* * * * *